(12) United States Patent
Thomas

(10) Patent No.: US 9,694,482 B2
(45) Date of Patent: Jul. 4, 2017

(54) TOOLING FOR PARTIAL DISASSEMBLY OF A BYPASS TURBOFAN ENGINE

(71) Applicant: Turbine Tooling Solutions LLC, Gilbert, AZ (US)

(72) Inventor: Erik C. Thomas, Gilbert, AZ (US)

(73) Assignee: TURBINE TOOLING SOLUTIONS LLC, Gilbert, AZ (US)

( * ) Notice: Subject to any disclaimer, the term of this patent is extended or adjusted under 35 U.S.C. 154(b) by 52 days.

(21) Appl. No.: 14/222,929

(22) Filed: Mar. 24, 2014

(65) Prior Publication Data
US 2014/0283350 A1    Sep. 25, 2014

Related U.S. Application Data

(62) Division of application No. 12/973,565, filed on Dec. 20, 2010, now Pat. No. 8,683,670.

(51) Int. Cl.
*B25B 27/00* (2006.01)
*B25B 27/06* (2006.01)
(Continued)

(52) U.S. Cl.
CPC ........ *B25B 27/0035* (2013.01); *B25B 27/062* (2013.01); *F01D 25/285* (2013.01);
(Continued)

(58) Field of Classification Search
CPC ............... B25B 27/0035; B25B 27/062; F01D 25/285; Y10T 29/49822; Y10T 29/53909; Y10T 29/5399
See application file for complete search history.

(56) References Cited

U.S. PATENT DOCUMENTS 5,383,652 A * 1/1995 Van Den Berg ..... B25H 1/0007
                                                              269/17
5,653,351 A * 8/1997 Grout ..................... B66C 19/00
                                                              212/315
(Continued)

OTHER PUBLICATIONS

PCT International Search Report in Application PCT/US2011/065878, mailed Aug. 27, 2012, 9 pgs.
U.S. Appl. No. 12/973,565.

*Primary Examiner* — Minh Trinh
(74) *Attorney, Agent, or Firm* — Lathrop & Gage LLP

(57) ABSTRACT

Tooling for partial disassembly of a bypass turbofan engine wherein the longitudinal axis of the bypass turbofan engine remains generally horizontal during disassembly. The low pressure turbine module is removed with a low pressure turbine module horizontal removal tool. An extended bearing nut tool may be supported by a stabilization member and may remove a bearing nut. An extended high pressure turbine shaft stretching tool may stretch a high pressure turbine shaft to release a high pressure turbine shaft nut. An extended bearing pulling tool may be used to pull a bearing while the low pressure turbine shaft remains in place. A modified measurement bridge may be used to measure the position of certain components while the low pressure turbine shaft remains in place. A nozzle jig may be used to assemble nozzles and feather seals to create a nozzle module. And an arcuate datum may be used to make certain measurements from the aft end of the high pressure turbine shaft while the low pressure turbine shaft remains in place.

19 Claims, 26 Drawing Sheets

(51) Int. Cl.
  *F01D 25/28* (2006.01)
  *F16C 35/00* (2006.01)

(52) U.S. Cl.
  CPC .......... *F16C 35/00* (2013.01); *F05D 2230/70* (2013.01); *Y10T 29/49822* (2015.01); *Y10T 29/53909* (2015.01); *Y10T 29/53991* (2015.01)

(56) References Cited

U.S. PATENT DOCUMENTS

| | | | |
|---|---|---|---|
| 7,159,401 B1 | | 1/2007 | Kurtz et al. |
| 7,735,363 B2 * | | 6/2010 | Mainville ................ F01D 17/02 |
| | | | 73/116.03 |
| 7,797,922 B2 | | 9/2010 | Eleftheriou et al. |
| 8,322,038 B1 | | 12/2012 | Heidari et al. |
| 8,683,670 B2 * | | 4/2014 | Thomas ................ B25B 27/062 |
| | | | 29/283 |
| 2003/0014961 A1 | | 1/2003 | Lawlor et al. |
| 2006/0108471 A1 | | 5/2006 | Renner |
| 2010/0040466 A1 | | 2/2010 | Vauchel et al. |
| 2010/0199755 A1 * | | 8/2010 | Mainville ................ F01D 17/02 |
| | | | 73/116.03 |

* cited by examiner

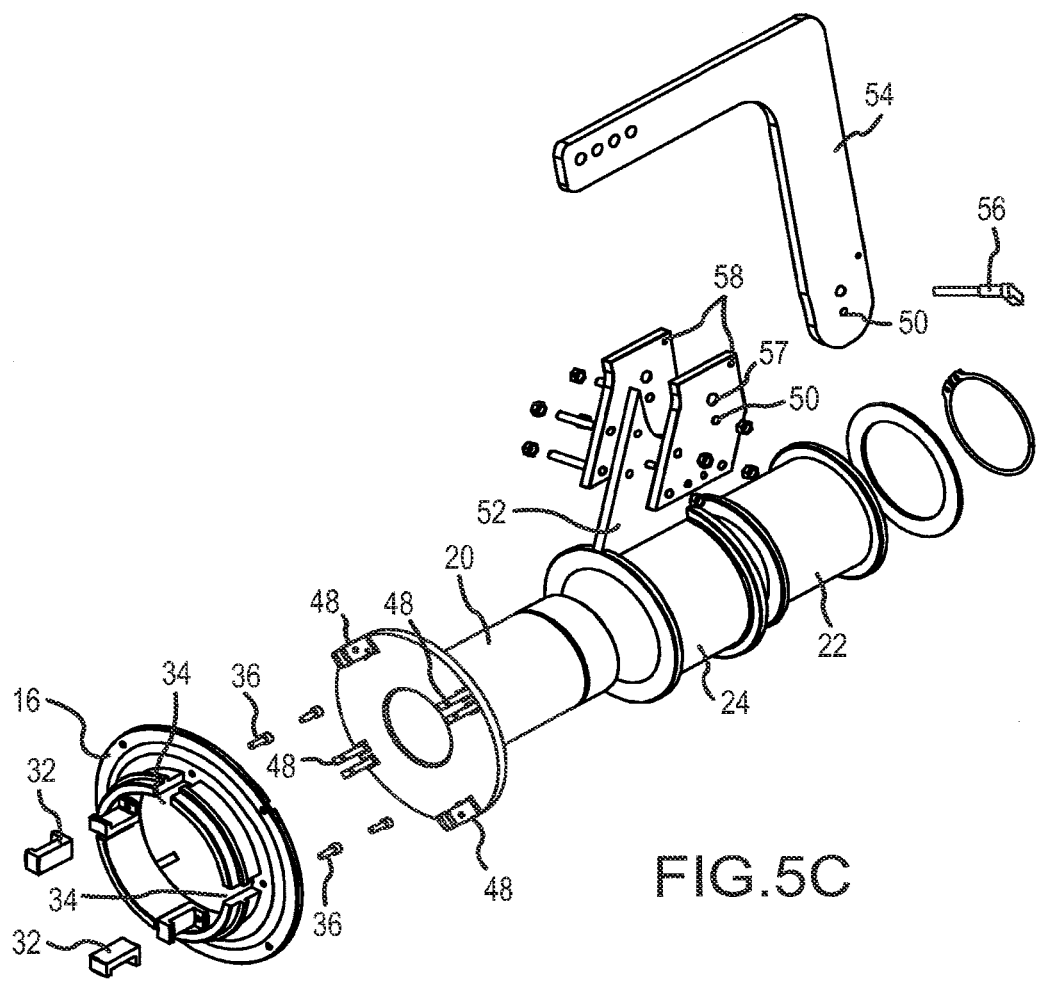

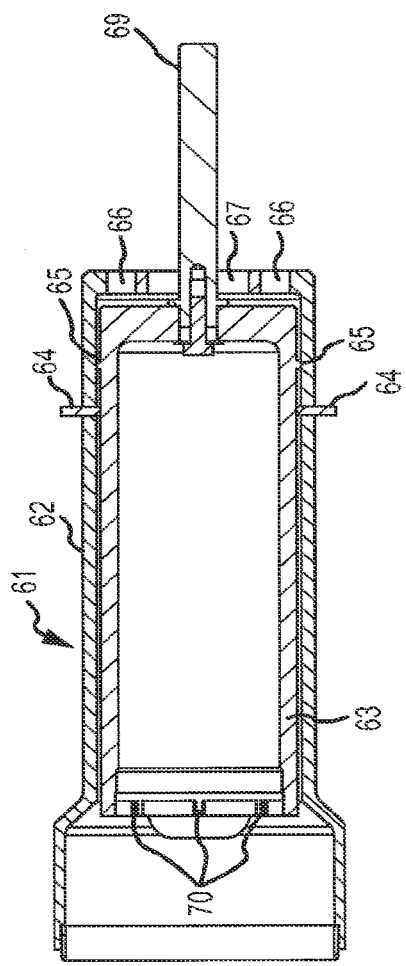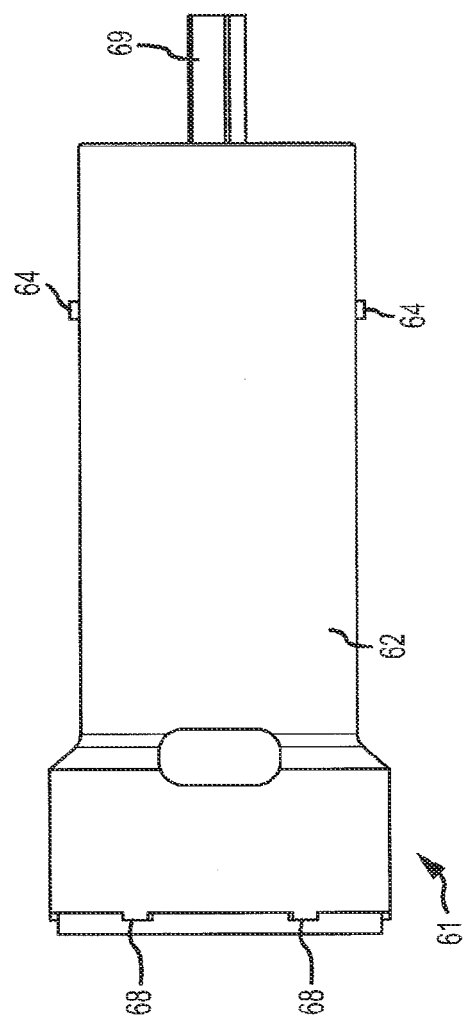
FIG. 7A
FIG. 7B

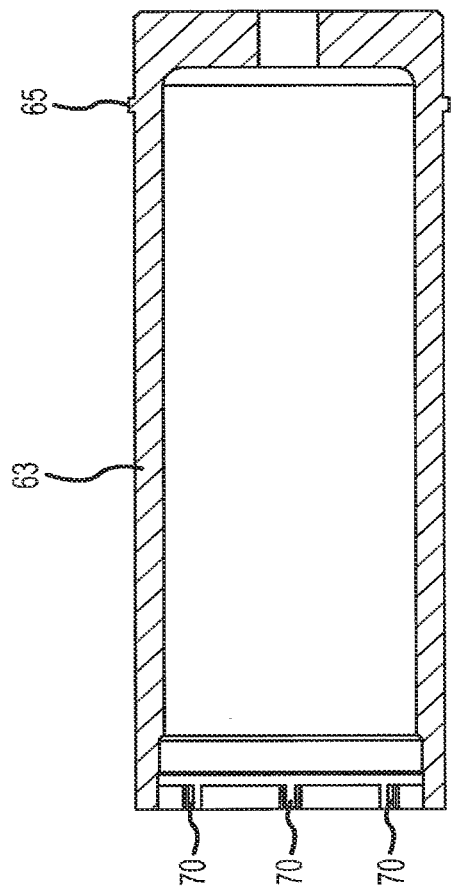
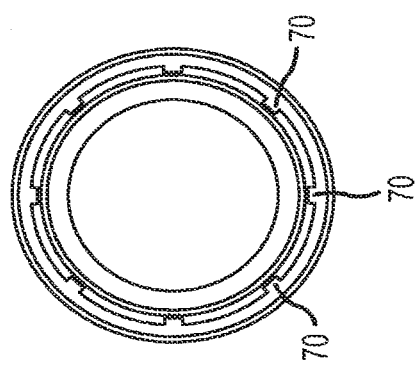
FIG. 7G
FIG. 7F

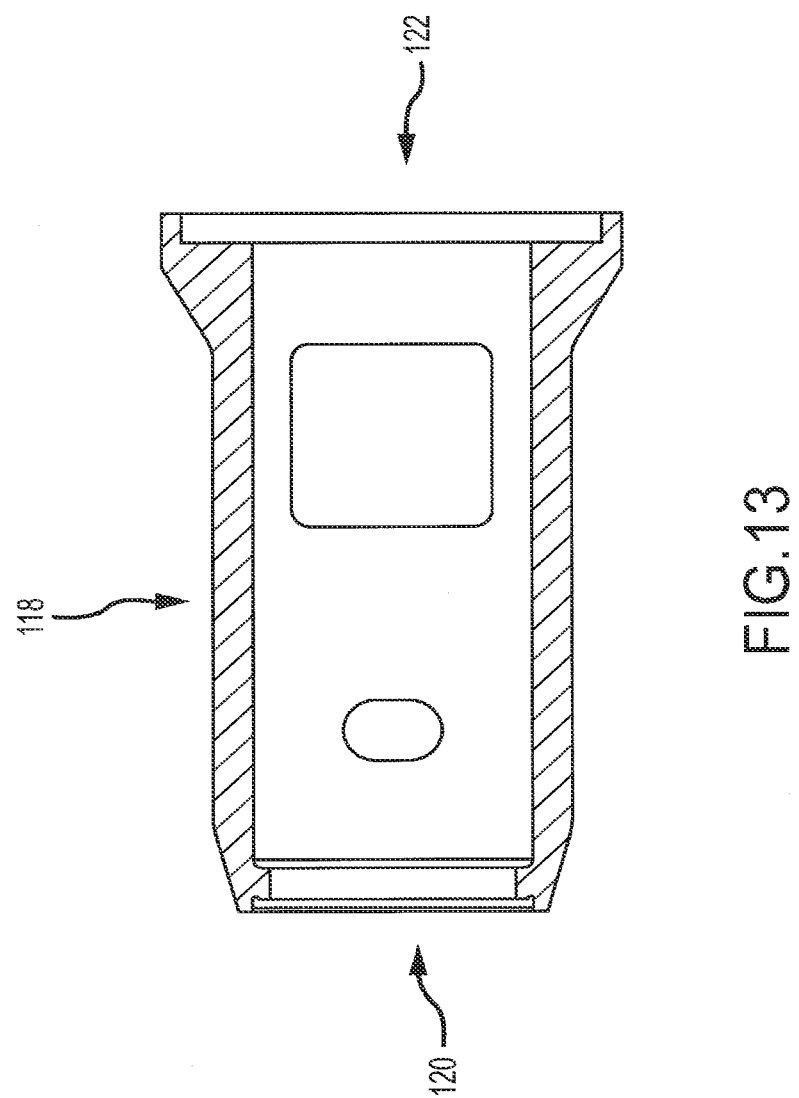

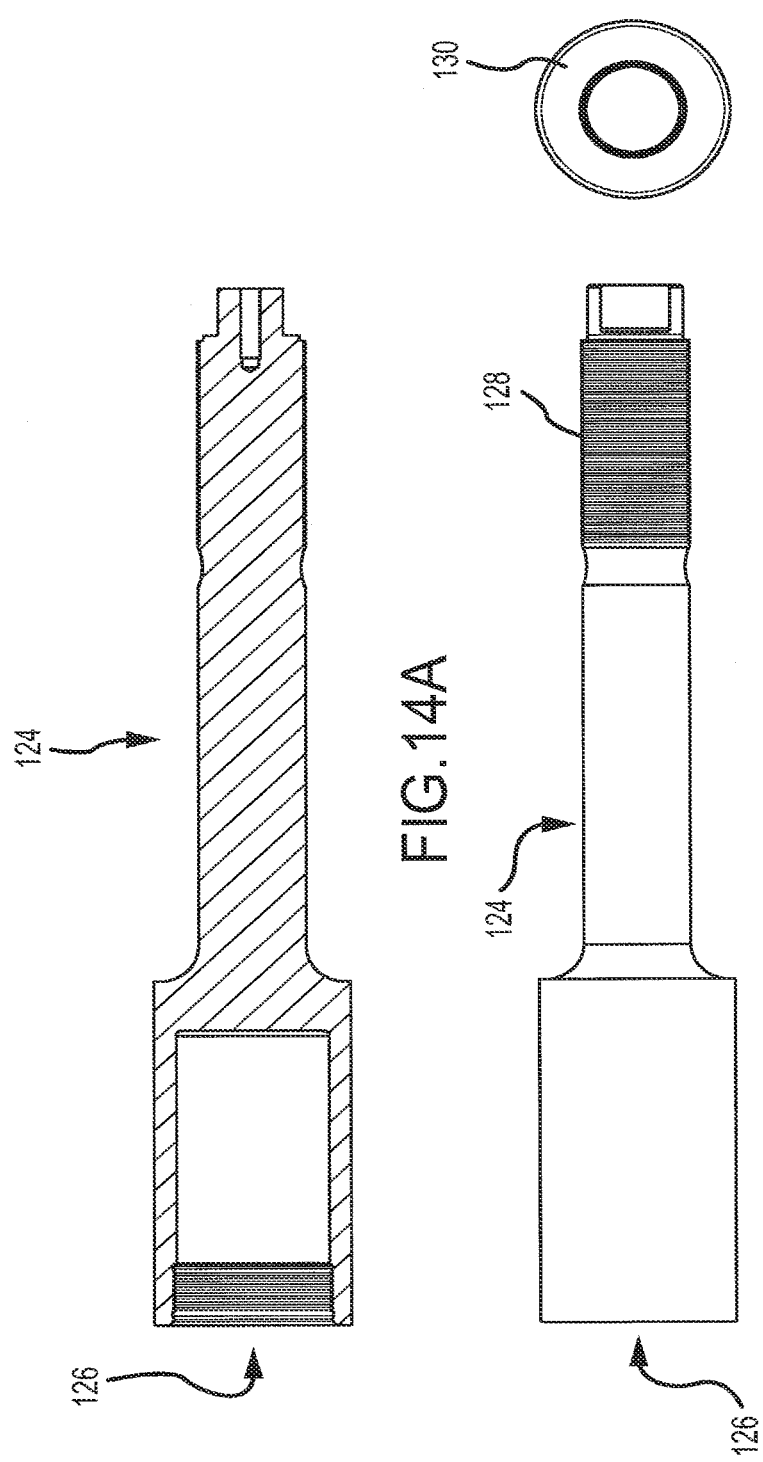

TOOLING FOR PARTIAL DISASSEMBLY OF A BYPASS TURBOFAN ENGINE

RELATED APPLICATIONS

This application is a divisional of, and claims the benefit of priority of, pending U.S. patent application Ser. No. 12/973,565, filed Dec. 20, 2010, and which is incorporated by reference herein.

BACKGROUND OF THE INVENTION

The Honeywell HTF 7000 bypass turbofan engine is typical of the engines used on commercial business jets. Business jet engines require periodic inspection and repair that may require removal of the engine from the aircraft.

Removal of an engine from an aircraft is expensive in that it requires not only the investment in disconnecting and reconnecting the engine from the aircraft but it may also require a test flight of the aircraft once the engine has been reattached. Typically, conventional inspection or repair of the aft portion of the HTF 7000 engine required that the engine be removed from the aircraft. The inlet spinner was removed from the engine and the engine was positioned with the longitudinal axis being vertical and the inlet portion of the engine being down. Thus positioned, the engine could be disassembled from the aft and relevant portions of the engine could be inspected and repaired as needed.

While disassembly of the HTF 7000 from the rear of the engine with the engine remaining on the aircraft presents many advantages, heretofore, tools and procedures for effectively doing so were unknown.

SUMMARY OF THE INVENTION

A method for partial disassembly of a bypass turbofan engine is provided wherein the longitudinal axis of the bypass turbofan engine remains horizontal. The method comprises the steps of connecting a first end of a low pressure turbine module horizontal removal tool to an aft end of a low pressure turbine module; attaching a second end of the low pressure turbine module horizontal removal tool to a lift, the connection being generally above the center of gravity of the low pressure turbine module and the connected low pressure turbine module horizontal removal tool; adjusting the upward force applied by the lift to counteract the force of gravity on the low pressure turbine module and the connected low pressure turbine module horizontal removal tool; applying a generally horizontal force to the low pressure turbine module to separate it from the engine; disengaging a bearing nut by positioning an extended bearing nut tool over a low pressure turbine shaft, the bearing nut tool engaging notches in the bearing nut and notches in a seal plate to impart a disengaging torque to the bearing nut; positioning a measuring bridge adjacent the aft end of the bypass turbofan engine to be disassembled, the measuring bridge positioned adjacent the low pressure turbine shaft, the measuring bridge providing a stable datum from which measurements may be taken; pulling a bearing by placing an extended bearing pulling tool around the low pressure turbine shaft, the extended bearing pulling tool gripping the bearing and applying a disengaging generally horizontal force to the bearing when the extended bearing pulling tool applies an opposing generally horizontal force to the low pressure turbine shaft; stretching a high pressure turbine shaft by placing an extended high pressure turbine shaft stretching tooling around the low pressure turbine shaft, a first portion of the extended high pressure turbine shaft stretching tool engaging the high pressure turbine shaft, a second portion of the extended high pressure turbine shaft stretching tooling engaging the seal plate, the extended high pressure turbine shaft stretching tooling transferring opposing generally horizontal forces to the high pressure turbine shaft and the seal plate to stretch the high pressure turbine shaft; and removing a nozzle assembly with a first stage nozzle assembly retaining tool, the nozzle assembly comprised of a plurality of interlocked nozzle segments and feather seals, the first stage nozzle assembly retaining tool securing the nozzle assembly such that the plurality of nozzle segments and feather seals remain interlocked upon removal.

In one embodiment, the low pressure turbine horizontal removal tool permits rotational freedom of the low pressure turbine module about the module's longitudinal axis.

In another embodiment, the low pressure turbine horizontal removal tool facilitates rotation of the low pressure turbine module longitudinal axis from horizontal to vertical.

In another embodiment, the nozzle assembly is placed in a nozzle assembly jig adapted to properly position the plurality of interlocked nozzle segments and feather seals, and the nozzle assembly jig facilitates the interlocked construction of the nozzle assembly from individual nozzle segments and feather seals.

In one embodiment, a support is inserted between the high pressure turbine shaft and a component radially displaced from the high pressure turbine shaft.

In another embodiment, a stabilization member is engaged with the combustion chamber case; and the extended bearing nut tool is supported on the stabilization member.

In yet another embodiment, a stabilization member is engaged with the combustion chamber case and the extended high pressure turbine shaft stretching tool is supported on the stabilization member.

In one embodiment, a datum member having an arcuate portion is used to engage the aft end of the high pressure turbine shaft such that distance may be measured from the datum member.

Another embodiment provides a tool adapted to remove a low pressure turbine module from a bypass turbofan engine while the bypass turbofan engine's longitudinal axis is generally horizontal. The tool has an attachment member adapted to connect to the low pressure turbine module. The tool also has an engagement member that is detachably connectable to the attachment member. The tool also has a lift member that is pivotally connected to the engagement member and the lift member has a lift point positioned generally over the center of gravity of the tool and the connected low pressure turbine module. The lift point is connectable to a lift.

In one embodiment, the lift member is pivotally connectable to the engagement member such that the low pressure turbine module may rotate about its longitudinal axis when connected to the lift member.

In another embodiment, the lift member is pivotally connectable to the engagement member such that the connected low pressure turbine module's longitudinal axis may be rotated from being generally horizontal to being generally vertical about a pivot in the lift member.

In one embodiment, a tool system is adapted for the assembly or disassembly of a portion of a bypass turbofan engine while the longitudinal axis of the engine is generally horizontal. The system comprises a low pressure turbine module horizontal removal tool. The low pressure turbine module removal tool is adapted to connect to a low pressure turbine module when the longitudinal axis of the bypass turbofan engine is generally horizontal. The low pressure turbine module horizontal removal tool is connectable with a lift at a lift point, and, the lift point is positioned generally above the center of gravity of the low pressure turbine module and connected to the low pressure turbine module horizontal removal tool.

In one embodiment, a stabilization member is adapted to connect to a combustion chamber case; and an extended bearing nut tool is adapted to surround a low pressure turbine shaft while engaging a bearing nut. The stabilization member is adapted to support the extended bearing nut tool such that the longitudinal axis of the extended bearing nut tool is generally horizontal when the extended bearing nut tool engages the bearing nut.

Another embodiment has an extended high pressure turbine shaft stretching tool adapted to surround the low pressure turbine shaft. A stabilization member is adapted to support the extended high pressure turbine shaft stretching tool such that the longitudinal axis of the extended high pressure turbine shaft stretching tool is generally horizontal when the extended high pressure turbine shaft stretching tool engages a high pressure turbine shaft.

One embodiment has an extended bearing pulling tool adapted to apply a generally horizontal compressive force to the low pressure turbine shaft and a generally horizontal tension force to a bearing.

Another embodiment has a first stage high pressure turbine nozzle assembly retaining tool. The nozzle assembly is comprised of a plurality of interlocked nozzle segments and feather seals. The first stage nozzle assembly retaining tool secures the nozzle assembly such that the plurality of nozzle segments and feather seals remain interlocked upon removal. The embodiment also has a nozzle assembly jig adapted to properly position the plurality of interlocked nozzle segments and feather seals. The nozzle assembly jig facilitating the interlocked construction of the nozzle assembly from the nozzle segments and feather seals.

In another embodiment, the system has a low pressure turbine module horizontal removal tool that is adapted to permit rotation of the low pressure turbine module about the longitudinal axis of the low pressure turbine module.

In one embodiment, the low pressure turbine module horizontal removal tool has a pivot adapted to permit rotation of the longitudinal axis of the low pressure turbine module from generally horizontal to generally vertical.

One embodiment provides a low-pressure turbine module removal tool comprising a low-pressure turbine module engagement member disengably connectable to a low-pressure turbine module and a lift member rotationally connectable to the low-pressure turbine module engagement member. The lift member is connectable to a lift.

In another embodiment, the low-pressure turbine module engagement member detachably connects to the low-pressure turbine module by compressing a portion of the low-pressure turbine module against a portion of the low pressure turbine module engagement member.

In one embodiment, the low-pressure turbine module engagement member has a flange positionable adjacent a low-pressure turbine module lip and a plurality of brackets adapted to compress the lip against the flange.

In one embodiment, the low-pressure turbine module engagement member is detachably connectable to the low pressure turbine module. The low-pressure turbine module engagement member is detachably connectable to a hub. The hub is rotationally connected to a lift member that is connectable to a lift at a position generally above the center of gravity of the low-pressure module and connected removal tool.

In another embodiment, the lift member comprises a first member; a second member and a bracket connected to the first member. The second member is pivotally connected to the bracket such that the second member may be fixed in a first position relative to the second member and rotated to a second position relative to the second member.

BRIEF DESCRIPTION OF THE DRAWINGS

FIG. 5C is an exploded perspective view of one embodiment of a low-pressure turbine module removal tool.

FIG. 7A is a cut away view of one embodiment of an extended nut removal tool.

FIG. 7B is a side view of one embodiment of an extended nut removal tool.

FIG. 7F is a partial view of an embodiment of an extended nut removal tool.

FIG. 7G is a partial view of an embodiment of an extended nut removal tool.

FIG. 13 is a cutaway side view of one embodiment of a high-pressure turbine shaft stretch fixture.

FIG. 14A is a side cutaway view of one embodiment of an extended high-pressure turbine shaft coupling.

FIG. 14B is a side view of one embodiment of an extended high-pressure turbine shaft coupling.

FIG. 14C is an end view of one embodiment of an extended high-pressure turbine shaft coupling nut.

DETAILED DESCRIPTION OF THE EMBODIMENTS

Figure 1:
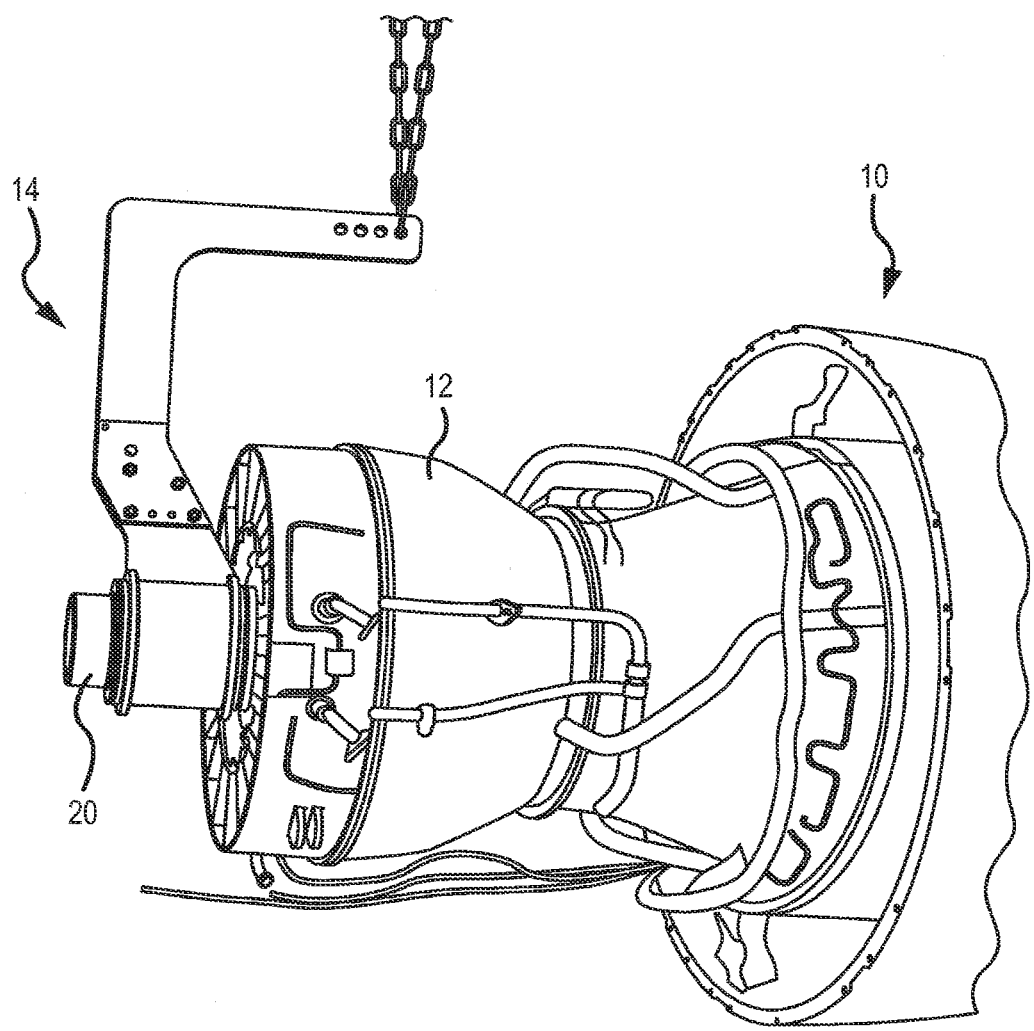
FIG. 1 is a perspective view of one embodiment of a low-pressure turbine module removal tool connected to a low-pressure turbine module assembled to a bypass turbofan engine.

Horizontal disassembly of an engine (10) such as the HTF 7000 from the rear requires removal of the aft sump (not shown) and number 5 bearing (not shown) as is conventionally known. Next, the low-pressure turbine module (12) may be removed. FIG. 1 depicts a horizontal low-pressure turbine module removal tool (14) connected to the low-pressure turbine module (12) with the low-pressure turbine module (12) attached to the remainder of the engine (10). The engine's (10) longitudinal axis is generally horizontal.

Figure 2:
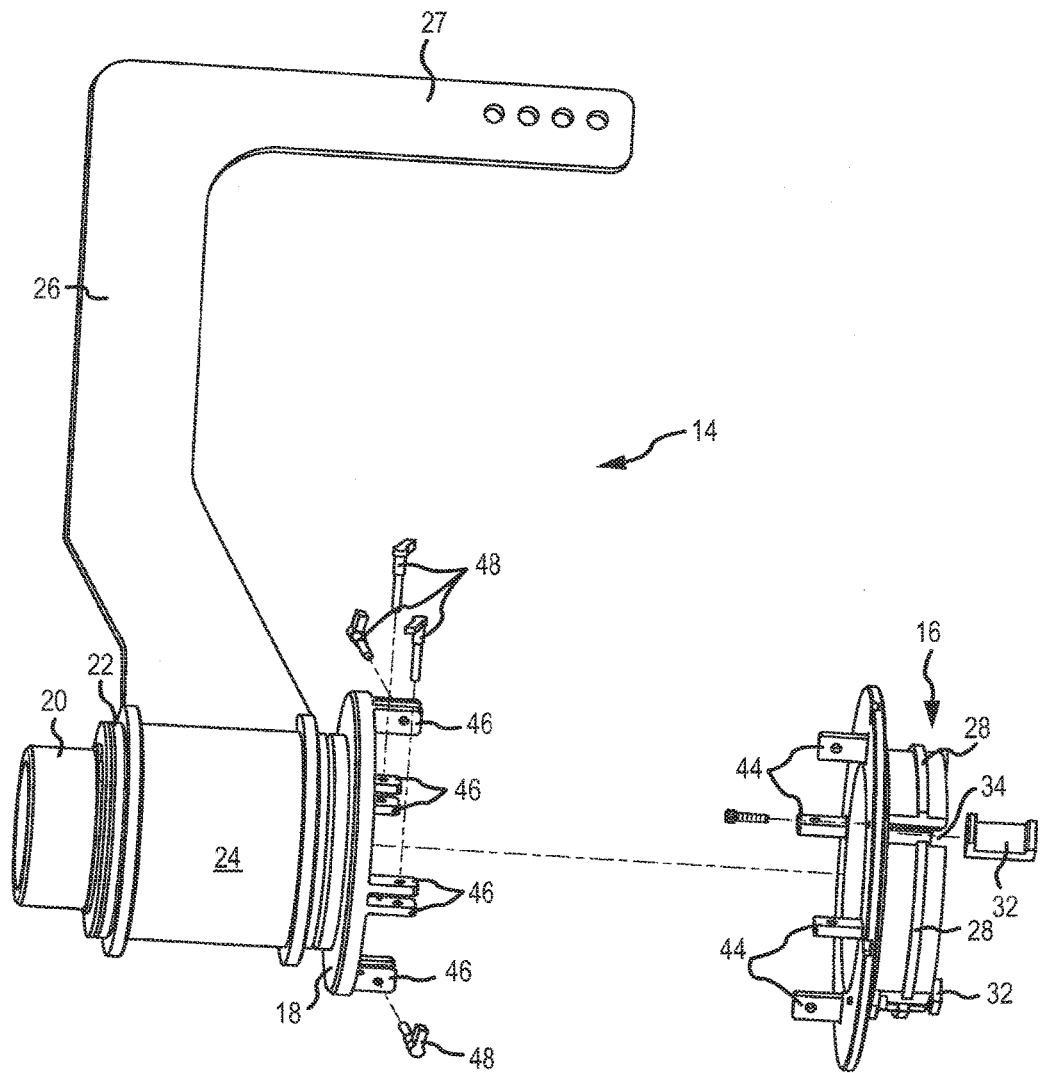
FIG. 2 is a partial exploded view of one embodiment of a low-pressure turbine module removal toll.

FIG. 2 depicts an embodiment of the horizontal low-pressure module removal tool (14). In one embodiment, the tool (14) has a detachable low-pressure turbine module attachment member (16), a hub (18) connected to a shaft (20) that rotationally engages a friction reducing insert (22) interposed between the shaft (20) and a cylindrical insert housing (24) that is connected to a vertical support member (26). The friction reducing insert (22) may be made of any material minimizing friction between components, such as, Teflon. The vertical support member (26) is connected to a horizontal support member (27). The low-pressure turbine module attachment member (16) may be connected to the low-pressure turbine module (12).

Figure 3:
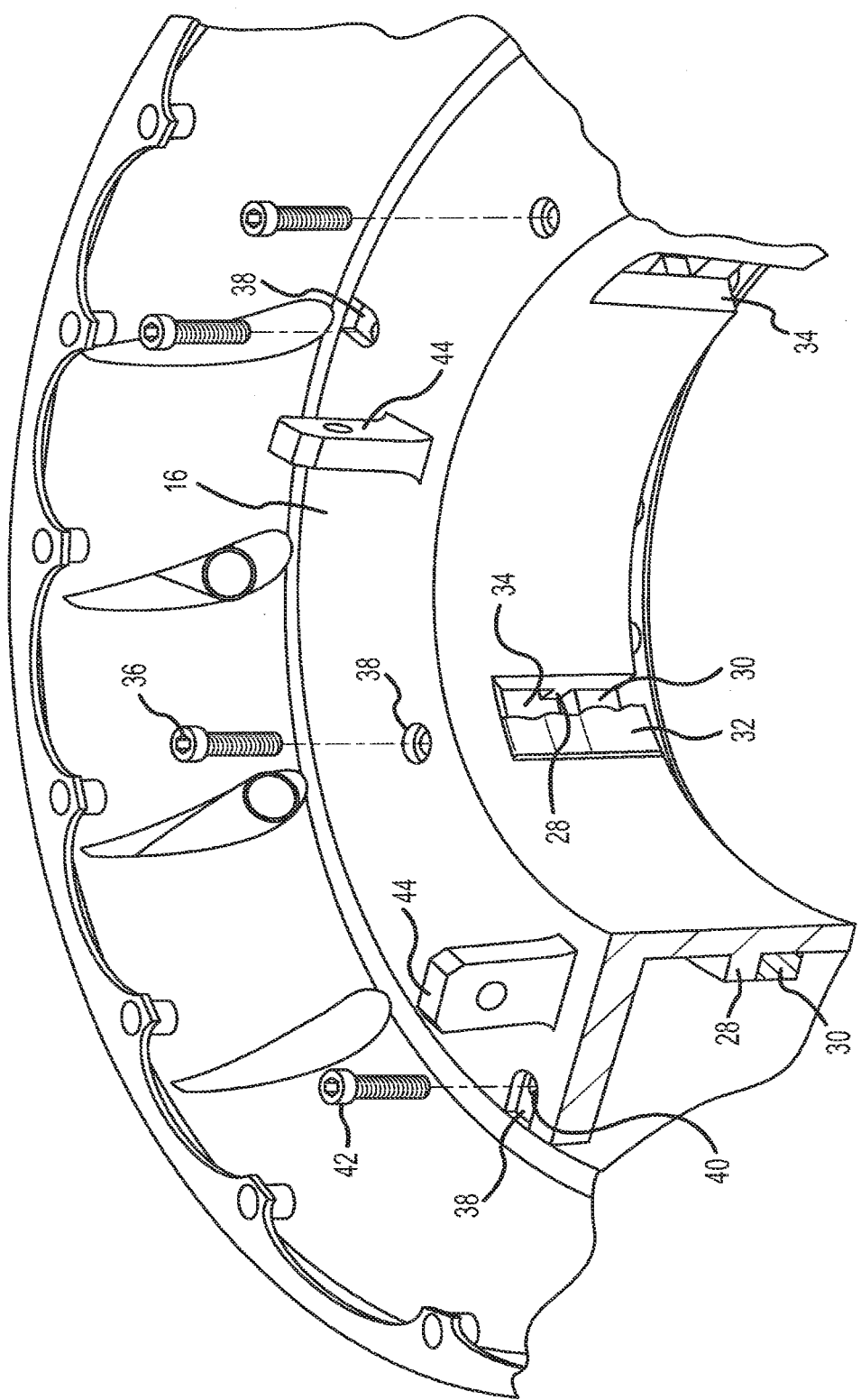
FIG. 3 is a partial cut away perspective view of one embodiment of a low-pressure turbine module engagement member connected to a low-pressure turbine module lip.

In one embodiment, the low-pressure turbine module attachment member (16) has an attachment member flange (28) that may be positioned adjacent a low-pressure turbine module lip (30) as shown in FIG. 3. A u-shaped securing bracket (32) may be inserted into a securing bracket slot (34) such that the securing bracket (32) extends radially adjacent the low-pressure turbine module lip (30) on the side opposite the adjacent attachment member flange (28). A bracket bolt (36) engages the securing bracket (32) through a bracket bolt aperture (38) in the low-pressure turbine module attachment member (16). Upon tightening the bracket bolt (36), the low-pressure turbine module lip (30) is secured between the securing bracket (32) and the attachment member flange (28).

The low-pressure turbine module attachment member (16) also has a plurality of slots (34) that are alignable over pre-existing low-pressure turbine module bolt apertures (40) in the low-pressure turbine module (12). Bolts (42) may be threaded into the pre-existing apertures (40) in the low-pressure turbine module (12) to provide a redundant connection between the low-pressure turbine module attachment member (16) and the low-pressure turbine module (12) or to prevent the low pressure turbine module (12) from rotating relative to the attachment member (16). One skilled in the art will readily recognize other possible methods of connecting a low pressure turbine attachment member (16) to the low-pressure turbine module (12).

In the embodiment depicted, a plurality of fingers (44) extend from the low-pressure turbine module attachment member (16) surface remote from the low-pressure turbine module (12). The fingers (44) facilitate connection with the hub (18). The hub (18) has a plurality of protruding receivers (46) adapted to receive the fingers (44) protruding from the low-pressure turbine module attachment member (16). In the embodiment depicted, pins (48) slidingly engage apertures in the fingers (44) and receivers (46) to connect the hub (18) to the low-pressure turbine module attachment member (16) to form the complete horizontal low-pressure turbine module removal tool (14).

Figure 4:
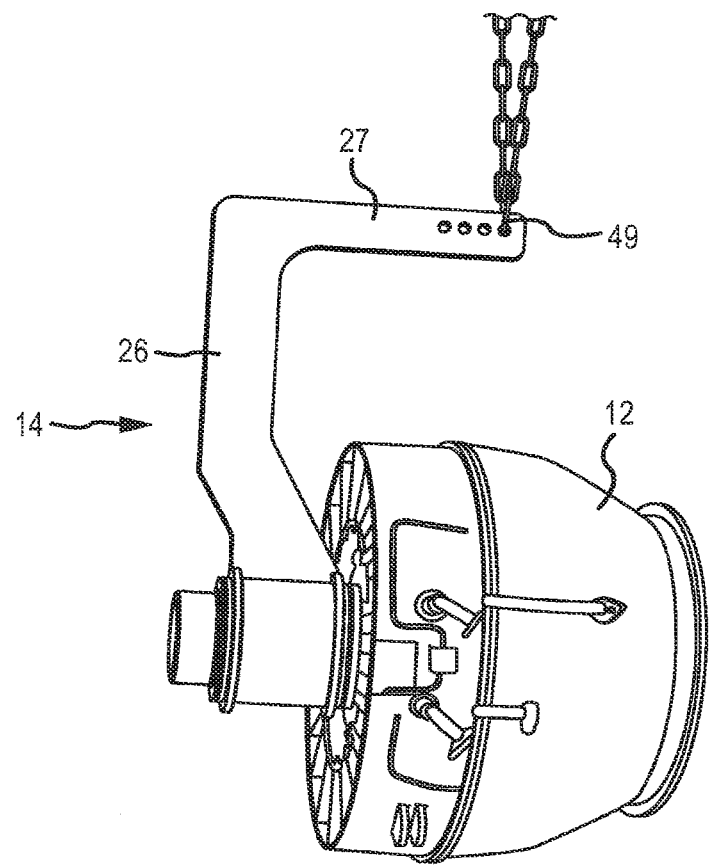
FIG. 4 is a perspective view of one embodiment of a low-pressure turbine module removal tool connected to a low-pressure turbine module detached from a bypass turbofan engine.

FIG. 4 depicts the low-pressure turbine module (12) supported by the horizontal low-pressure turbine module removal tool (14). The horizontal support member (27) extends from the vertical support (26) and has a lift point (49) that corresponds to the center of gravity of the low-pressure turbine module (12) and connected horizontal low-pressure turbine module removal tool (14). The lift point (49) is connectable to a lift that facilitates the horizontal removal of the low pressure turbine module.

Figure 5A:
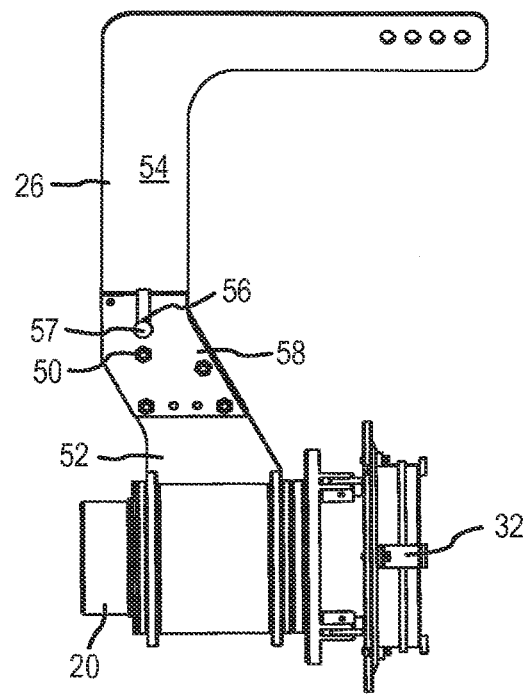
FIG. 5A is a side view of one embodiment of a low-pressure turbine module removal tool in a first position.
Figure 5B:
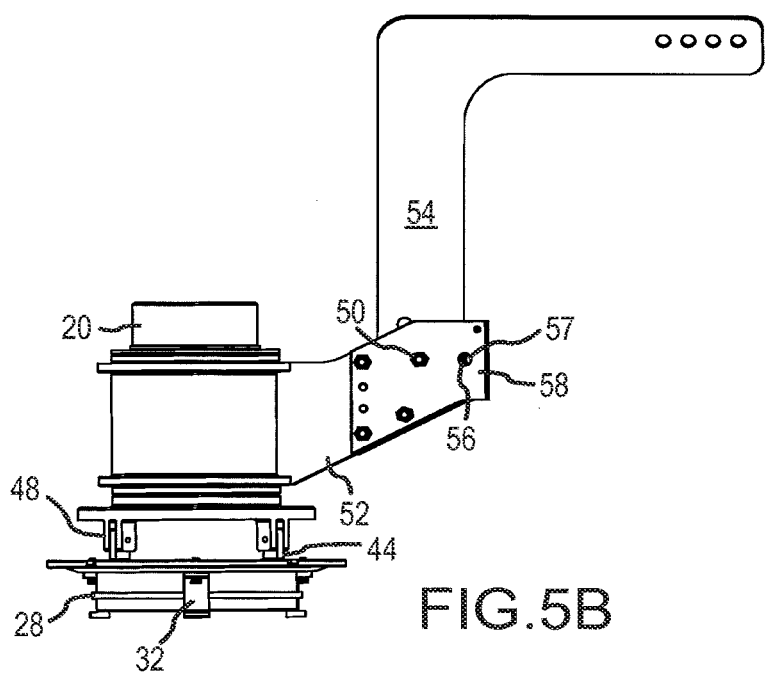
FIG. 5B is a side view of one embodiment of a low-pressure turbine module removal tool in a second position.

In another embodiment, the vertical support (26) has a pivot (50) interposed between a first vertical support member (52) and a second vertical support member (54) (as shown in FIG. 5A). A vertical support member pin (56) may be inserted through apertures (57) in bracket (58) that connects the first vertical support member (52) and the second vertical support member (54). The pin (56) secures the second vertical support member (54) in a position that is generally perpendicular to the axis of the shaft (20), as shown in FIG. 5A, when the pin (56) engages the first aperture in the second vertical support member (54). When the second vertical support member (54) rotates to a position that is generally parallel to the longitudinal axis of the shaft (20), as depicted in FIG. 5B, the pin (56) may be inserted through aperture (57) and engage the side of second vertical support member (54) to secure low pressure turbine module removal tool in the position depicted. FIG. 5C depicts an exploded view of one embodiment.

The use of the horizontal low-pressure turbine module removal tool (14) is briefly described below:

An HTF 7000 engine (10), sans aft sump and number 5 bearing, is oriented such that its longitudinal axis is generally horizontal. A low-pressure turbine module attachment member (16) is placed generally where the aft sump had been located. The attachment member flange (28) is placed adjacent the aft-side of the low pressure turbo module lip (30) and a plurality of securing brackets (32) are inserted through securing bracket slots (34) such that they extend radially adjacent the fore-side of the low-pressure turbine module lip (30). Bracket bolts (36) are inserted into bracket bolt apertures (38) in the low-pressure turbine module attachment member (16) and engage the plurality of securing brackets (32) placed adjacent the fore side of the low-pressure turbine module lip (30). Upon tightening the bracket bolts (36), the securing brackets (32) create a compressive force securing the low-pressure turbine module lip (30) between the attachment member flange (28) and the securing brackets (32).

In one embodiment, as a precaution, a plurality of slots (34) in the low-pressure turbine module attachment member (16) align over pre-existing threaded bolt apertures (40) in the low-pressure turbine module (12). Bolts (42) may be threaded into the pre-existing bolt apertures (40) and engage the low-pressure turbine module attachment member (16) to provide a redundant securement of the low-pressure turbine module (12) to the low-pressure turbine module attachment member (16). The bolts also prevent rotation of the low-pressure turbine module attachment member (16) relative to the low-pressure turbine module (12).

Once the low-pressure turbine module attachment member (16) is connected to the low-pressure turbine module (12), the hub (18) may be positioned such that the fingers (44) of the low-pressure turbine module attachment member (16) engage the receivers (46) in the horizontal lifting bracket hub (18). Pins (48) are inserted in the apertures in the receivers (46) and fingers (44) to securely connect the horizontal lifting bracket hub (18) to the low-pressure turbine module attachment member (16). Once connected, the vertical support member (26) and connected horizontal support member (27) may be rotated about the axis of the hub (18) and the lift point (49) may then be connected to a lift. The lift point (49) is selected such that it is generally above the center of gravity of the low-pressure turbine module (12) and attached horizontal low-pressure turbine module removal tool (14). The lift point (49), positioned above the center of gravity of the combined low-pressure turbine module (12) and horizontal low-pressure turbine module removal tool (14), enables the application of a lifting force that counteracts the force of gravity on the low-pressure turbine module (12) without creating any undesirable loads that might cause binding or abrupt movements that might damage fragile sealing mechanisms or other components of the engine (10). Once the proper lifting force is applied to the horizontal low-pressure turbine module removal tool (14), the low-pressure turbine module (12) may be disengaged from the remainder of the engine (10), as is known conventionally and the low-pressure turbine module (12) may be translated generally horizontally along the longitudinal axis of the engine (10) until the low-pressure turbine module (12) is completely disengaged from the engine (10) as depicted in FIG. 4.

In one embodiment, once the low-pressure turbine module (12) has been removed from the engine (10), the vertical support member pin (56) can be removed from its first position and placed in its second position. When the vertical support pin (56) is in the second position, the second vertical support member (54) is in an orientation generally parallel with the axis of the hub (18), as shown in FIG. 5B. Once the second vertical support member (54) is positioned generally parallel with the axis of the hub (18), the low-pressure turbine module (12) can be safely lowered onto a support structure such that the low-pressure turbine module (12)'s longitudinal axis is generally vertical. In this position, the low-pressure turbine module (12) may be safely stored until reassembly or the horizontal low-pressure turbine module removal tool (14) can be removed from the low-pressure turbine module (12) and the low-pressure turbine module (12) may be further disassembled.

The low-pressure turbine module (12) may be reconnected to the engine (10) generally by reversing the process previously described. It should be noted that upon reassembly, the friction reducing insert (22) permits rotation of the low-pressure turbine module (12) about its longitudinal axis which facilitates proper alignment of the low-pressure turbine module (12) with the engine (10) for reassembly.

Figure 6:
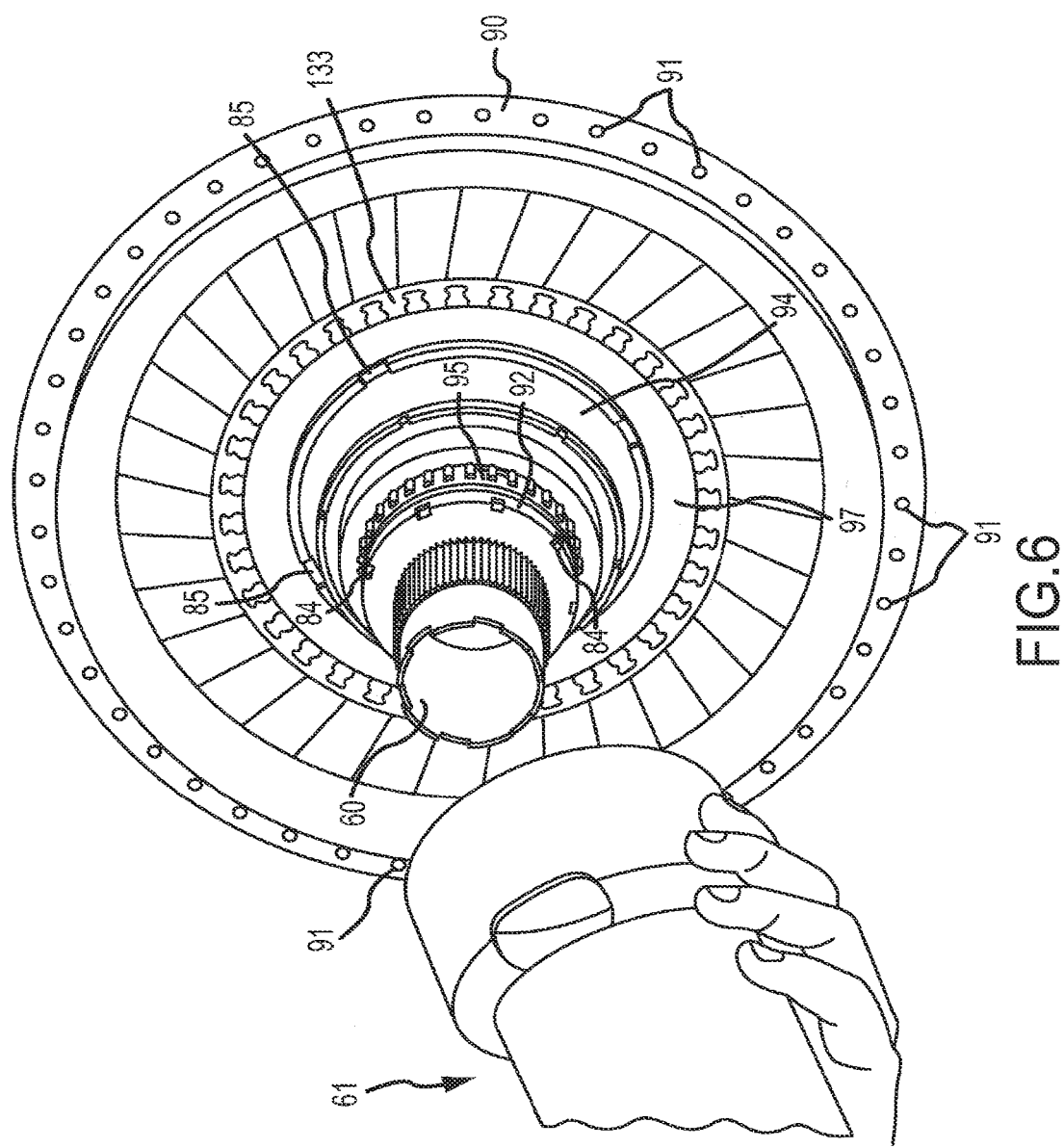
FIG. 6 is a perspective view of a portion of a bypass turbofan engine and one embodiment of an extended nut removal tool.

During on-wing disassembly, the low-pressure turbine shaft (60) may remain in place, thus tooling used for the horizontal disassembly and assembly of the aft components of a by-pass turbofan engine (10) such as the HTF 7000 must accommodate the aft extending low-pressure turbine shaft (60) as shown in FIG. 6. As will be apparent to one of ordinary skill in the art, the extended nut removal tool (61), and other tools discussed below, are similar to tools that would be used in a conventional assembly or disassembly but are adapted to accommodate the extending low-pressure turbine shaft (60).

Figure 7C:
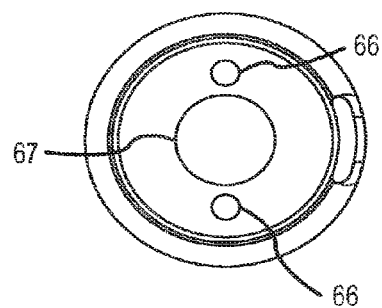
FIG. 7C is an end view of one embodiment of an extended nut removal tool.
Figure 7D:
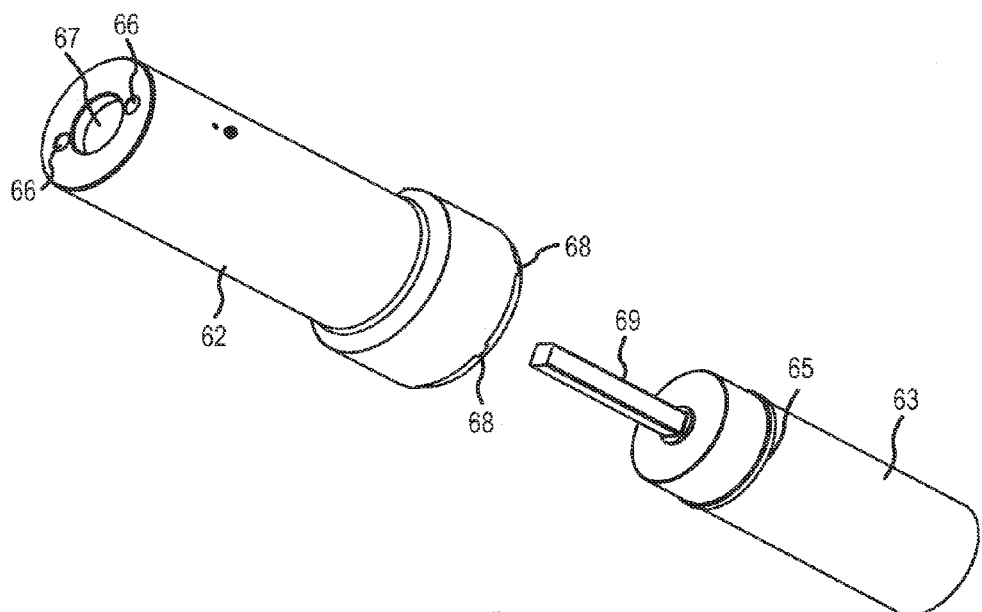
FIG. 7D is a partial exploded perspective view of one embodiment of an extended nut removal tool.
Figure 7E:
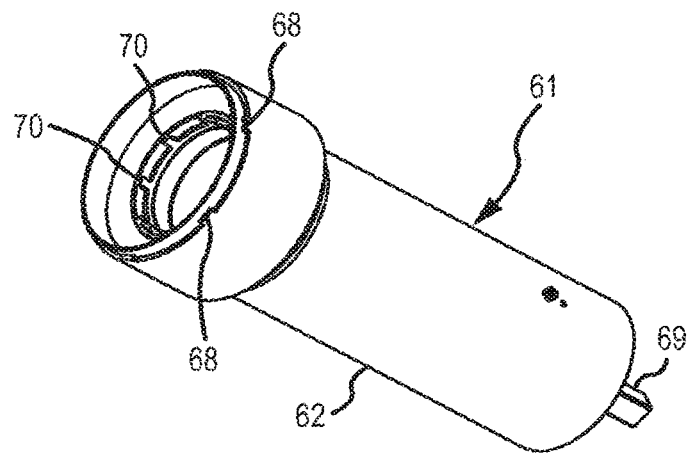
FIG. 7E is a perspective view of one embodiment of an extended nut removal tool.
Figure 8:
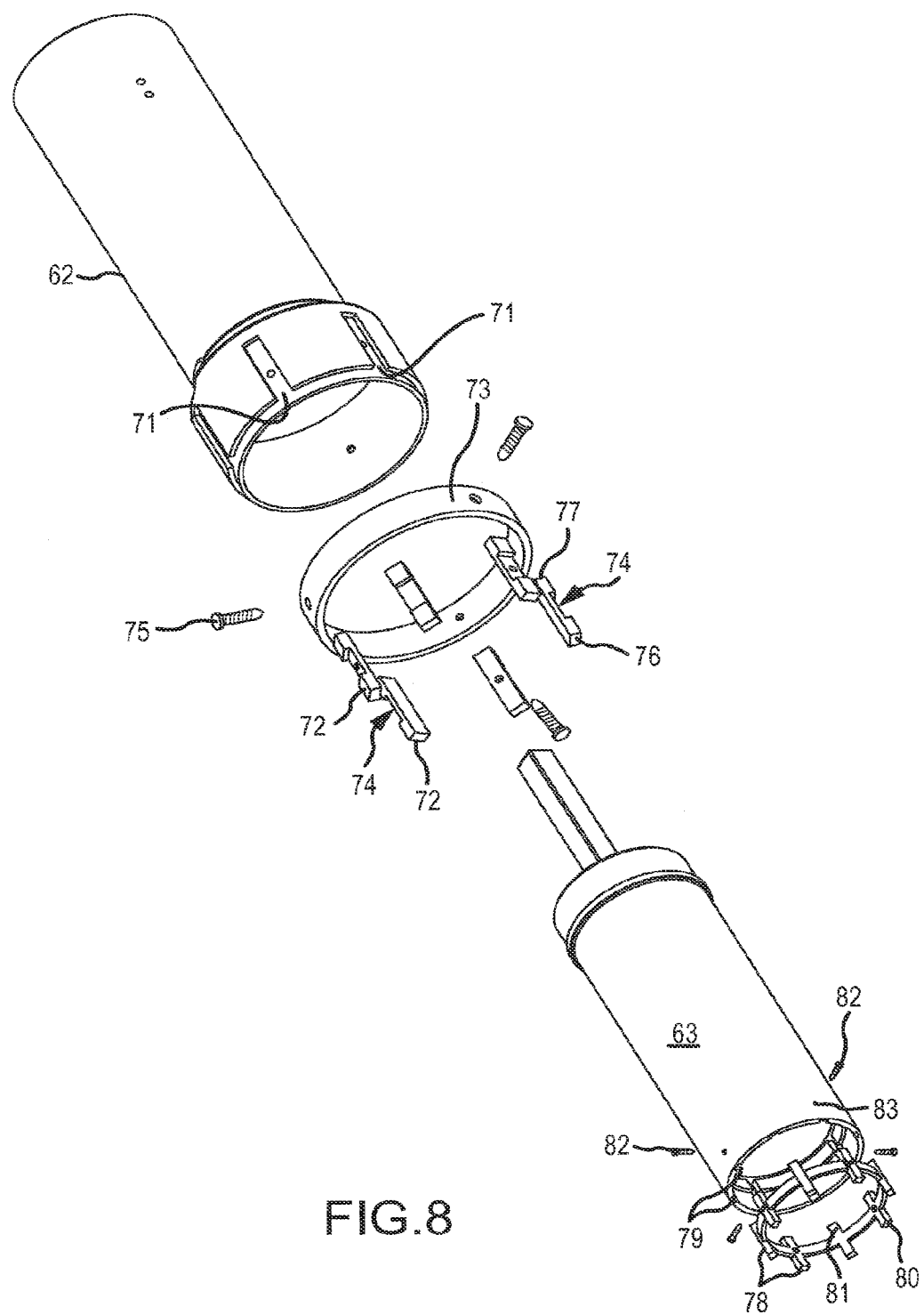
FIG. 8 is a perspective view of one embodiment of an extended nut removal tool.

In one embodiment, as depicted in FIG. 7A, the extended nut removal tool (61) has an outer body (62) and an inner body (63). The outer body (62) encases the inner body (63). Outer body pins (64) extend slightly past the interior surface of the outer body (62). Outer body pins (64) engage an inner body lip (65) to prevent the inner body (63) from unintentionally separating from the outer body (62). The proximal end of the outer body (62) has two torque apertures (66) and an outer body torque bar aperture (67). These features are also depicted in FIGS. 7c and 7d. At the distal end of the outer body of the extended nut removal tool (61) are a plurality of seal plate engaging teeth (68). The proximal end of the inner body (63) has a torque bar (69) that extends through the outer body torque bar aperture (67). The distal end of the inner body (63) has a plurality of radially inwardly extending nut engaging teeth (70). The nut engaging teeth (70) and seal plate engaging teeth (68) are also depicted in FIG. 7E. FIGS. 7F and 7G also show the nut engaging teeth (70).

The seal plate engaging teeth and nut engaging teeth are subjected to significant forces and may become worn with time. Worn teeth may lead to slippage and damage to valuable components as well as danger to those working adjacent the tool. One embodiment of the present invention provides hardened replaceable teeth to overcome the shortcomings of known bypass turbofan engine nut removal tools. In this embodiment, the outer body (62) has a plurality of slots (71) at its distal end. Hardened removable teeth (72) slidingly engage the slots (71) such that the removal teeth (72) fit securely within the slots (71). A securement ring (73) fits in a recess (74) in the removable teeth (72) such that the removable teeth (72) are securely held in the slots (71). Screws (75) connect the securement ring (73) to the outer body (62). If a first end (76) of the removable teeth (72) becomes worn, the securement ring (73) and removable teeth (72) may be removed and, if not previously worn, the teeth (72) may be repositioned such that the second end (77) of the teeth (72) will project from the outer body (62).

Replaceable nut engaging teeth (78) may also slidingly engage slots (79) in the distal end of inner body (63). The nut engaging teeth (78) have a first end (80) and a second end (81). If the first end (80) becomes worn, the teeth (78) may be removed and rotated to expose the second end (81). The replaceable nut engaging teeth (78) are held in place by a plurality of screws (82) that pass through an apertures (83) in the inner body (63) and engage the replaceable nut engaging teeth (78).

Figure 9:
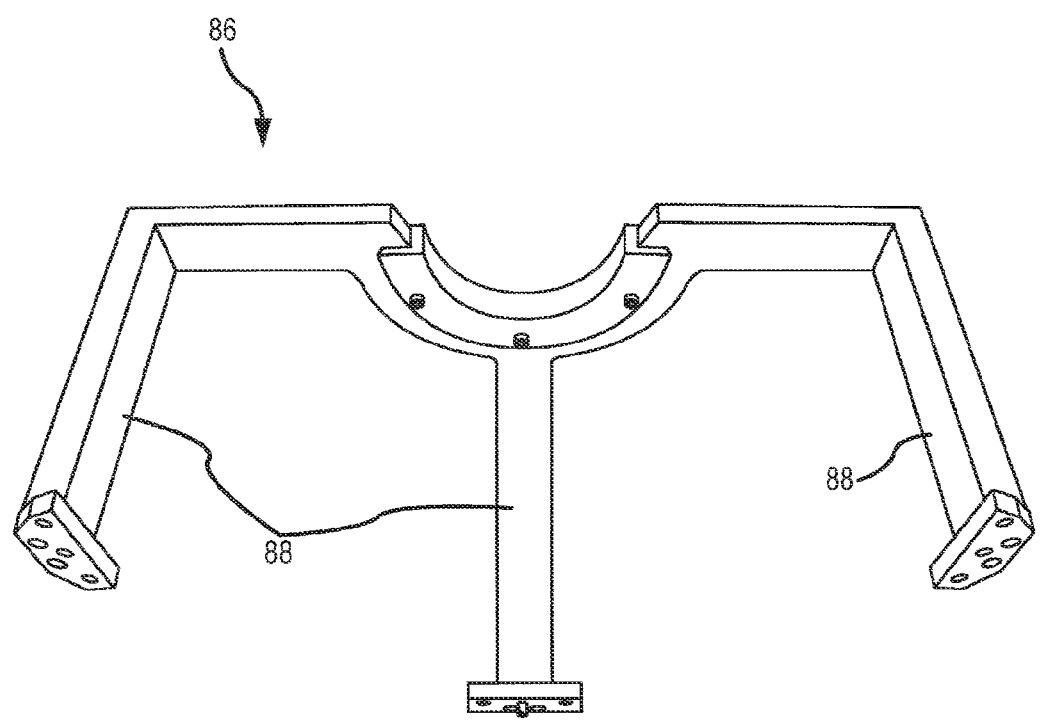
FIG. 9 is a perspective view of one embodiment of a support.

As understood by those of skill in the art, in vertical construction and deconstruction of by-pass turbofan engines (10) such as the HTF 7000, the weight of the nut removal tool (61) enhances engagement of the tool with the number 4 bearing nut grooves (84) and the seal plate notches (85), shown in FIG. 6. In the horizontal assembly or disassembly of a by-pass turbofan engine (10), the weight of the extended nut removal tool (61) does not enhance its engagement with the number 4 bearing nut grooves (84) and the seal plate notches (85). In one embodiment, a cradle (86), as shown in FIG. 9, is used to support the extended nut removal tool (61) such that the tool's longitudinal axis remains horizontal and proper engagement with the number 4 bearing nut grooves (84) and seal plate notches (85) is facilitated. In one embodiment, the cradle (86) has three legs (88) that detachably connect to the periphery of the combustion chamber (90).

A brief description of the use of the extended nut removal tool (61) and cradle (86) follows:

The legs (88) of the cradle (86) are bolted to holes (91) in the periphery of the combustion chamber (90) such that the cradle (86) extends away from the aft of the combustion chamber periphery (90). The extended nut removal tool (61) is positioned such that the seal plate engaging teeth (68) are engaged with the seal plate notches (85) and the nut engaging teeth (70) are engaged with the number 4 bearing nut grooves (84) and the opposite end of the tool (61) is supported by the cradle (86). The extended nut removal tool (61) is supported by the cradle (86) such that its longitudinal access is generally horizontal and is aligned with the longitudinal axis of the engine (10). Once the extended nut removal tool (61) is engaged with the seal plate notches (85) and the number 4 bearing nut grooves (84), a torque multiplier (not shown), as is known in the art, slidingly engages the torque bar (69) while protrusions on the torque multiplier engage the torque apertures (66). Upon activation of the torque multiplier, a nut-releasing torque is applied to the number 4 bearing nut (92) and a counter torque is applied to the seal plate (94). The process is reversed for assembly.

During assembly and disassembly of a by-pass turbofan engine (10) such as the HTF 7000, recording the relative position of certain components is critical for proper reassembly of the engine (10). As known conventionally, in the HTF 7000 engine (10) disassembly, measurements of the number 4 bearing (95) relative to the aft end of the low-pressure turbine shaft (60) and measurements of the second stage high-pressure turbine wheel (97) relative to the aft end of the high-pressure turbine shaft (96) are taken such that it can be verified upon reassembly that the number 4 bearing (95) and second stage high-pressure turbine wheel (97) are properly positioned on the high-pressure turbine shaft (96). In conventional assembly and disassembly of a by-pass turbofan engine (10), a measuring bridge (not shown) is provided. The conventional measuring bridge extends across the longitudinal axis of the engine (10) and provides a datum from which measurements can be taken. A conventional measuring bridge is unworkable when the engine (10) is being disassembled while its longitudinal axis is horizontal because the low pressure turbine shaft (60) interferes with the normal placement of the measuring bridge.

Figure 10:
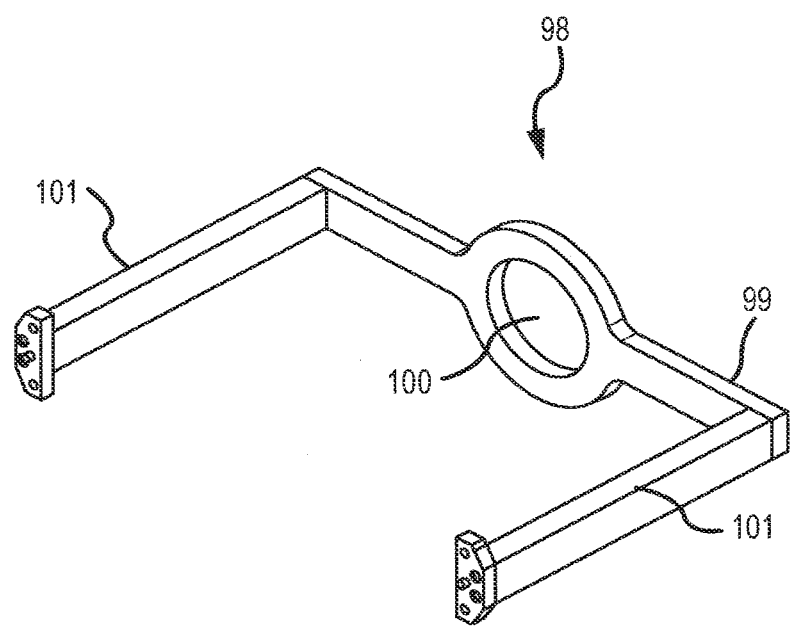
FIG. 10 is a perspective view of one embodiment of an extended measuring bridge.

In one embodiment of the present invention, an extended measuring bridge (98) is provided, as shown in FIG. 10. The extended measuring bridge (98) has an extended measuring datum (99) that has an aperture (100) through which the low pressure turbine shaft (60) can pass and a pair of legs (101) that engage the combustion chamber periphery (90). In practice, when the extended measuring bridge (98) is attached to the combustion chamber periphery (90), measurements can be taken from the extended measuring bridge datum (99) to record the relative placement of the number 4 bearing (95) and the second stage high-pressure turbine wheel (97) before these components are removed. Upon reassembly, measurements are taken from the extended measuring bridge datum (99) to verify proper placement of the number 4 bearing (95) and second stage high-pressure turbine wheel (97).

Figure 11:
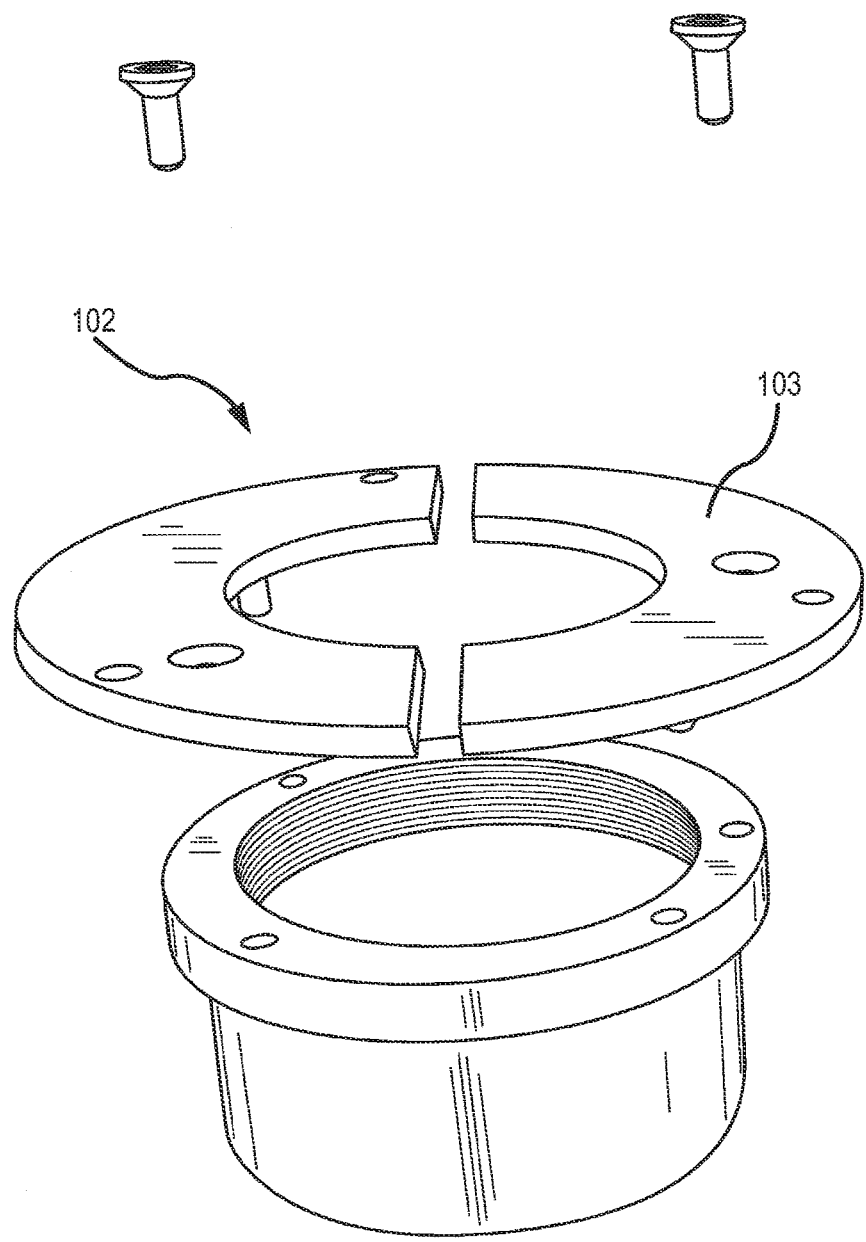
FIG. 11 is a perspective view of one embodiment of an arcuate measuring tool.

Additional measurements may be taken from the aft end of the high pressure turbine shaft (96) after further disassembly. Such are difficult during horizontal disassembly because the low-pressure turbine shaft (60) prevents stable engagement of a measuring tool with the aft end of the high pressure turbine shaft (96). In one embodiment, an arcuate measuring tool (102), as shown in FIG. 11, is provided that threads on the aft end of the high pressure turbine shaft (96) adjacent the protruding low pressure turbine shaft (60). The arcuate measuring tool (102) provides an arcuate datum (103) from which measurements may be taken.

Once the measurements are taken from the extended measuring bridge, the number 4 bearing (95) can be removed. When the axis of the HTF 7000 by-pass turbofan engine (10) is horizontal an extended number 4 bearing puller (104) is needed to pull the number 4 bearing (95). The extended number 4 bearing puller (104) is identical to a conventional number 4 bearing puller except that it is extended to compensate for the presence of the low pressure turbine shaft (60). To pull the number 4 bearing (95) of the HTF 7000 by-pass turbofan engine, extending number 4 bearing puller halves (106) are placed around the number 4 bearing (95) and engage the fore-side of the number 4 bearing (95), as show in FIG. 12A. The extended number 4 bearing puller (104) has a screw mechanism (108) that creates a pulling force on the number 4 bearing (95). At the distal end of the screw mechanism (108) is a low-pressure turbine shaft engager (110). The low-pressure turbine shaft engager (110) also engages the screw mechanism (108) that is threaded into a bearing puller engager (114).

Figure 12A:
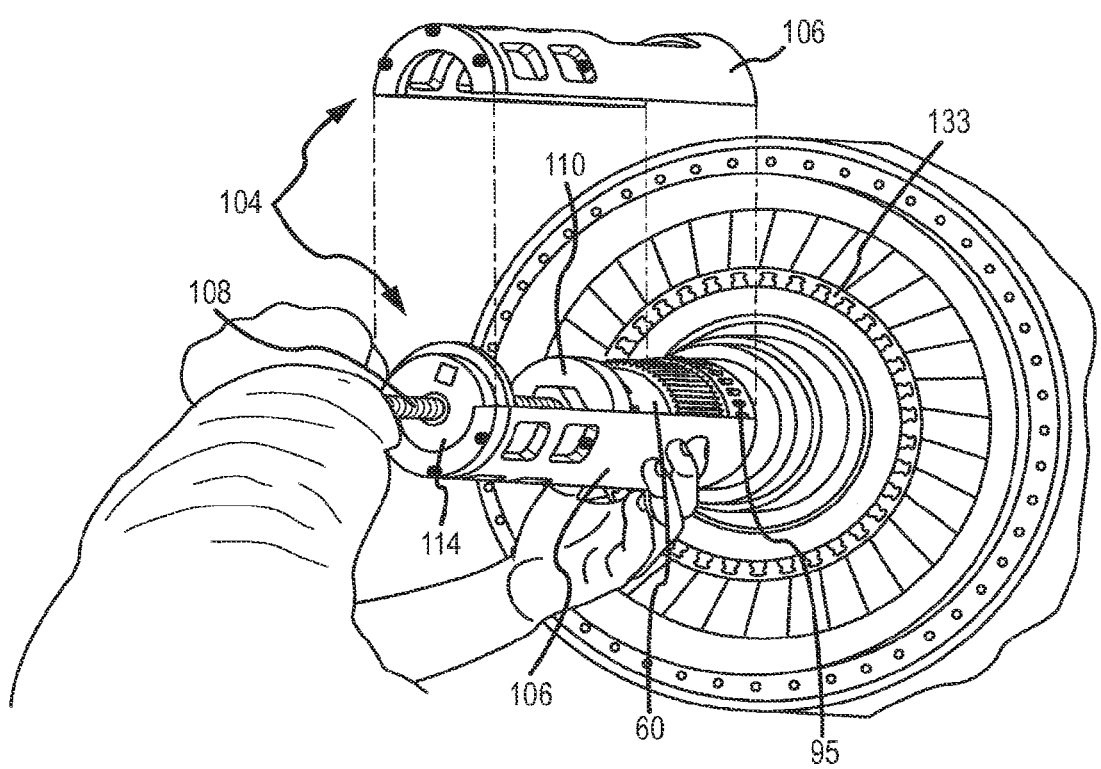
FIG. 12A is a perspective and partial exploded view of one embodiment of an extended bearing pulling tool attached to a bypass turbofan engine.
Figure 12B:
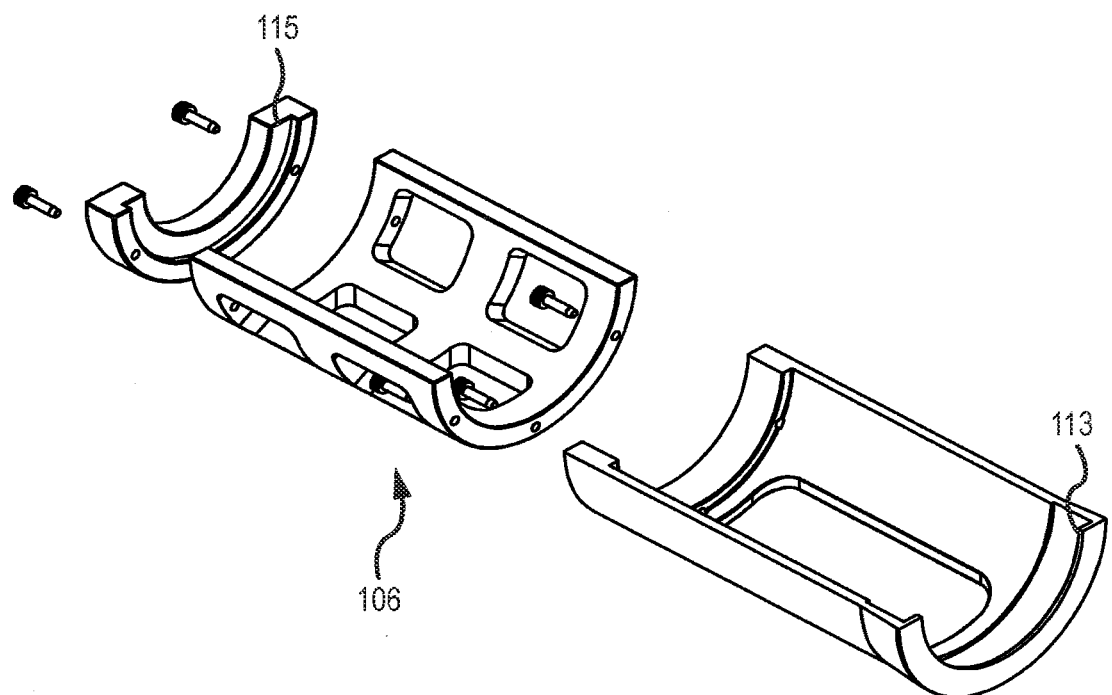
FIG. 12B is an exploded view of one embodiment of an extend bearing puller half.
Figure 12C:
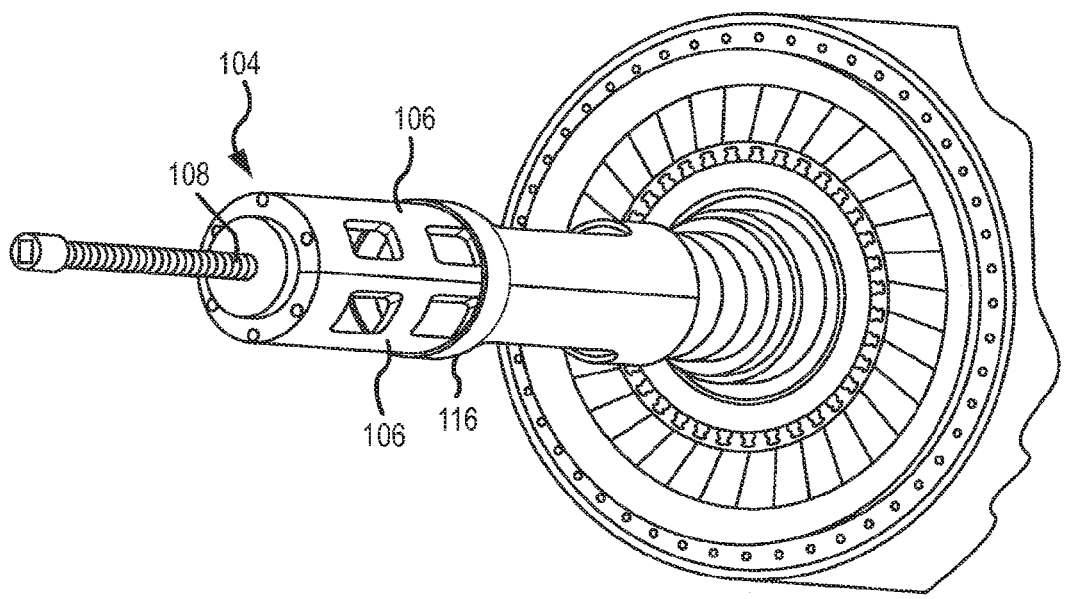
FIG. 12C is a perspective view of one embodiment of an extended bearing puller attached to a bypass turbofan engine.

The extended number 4 bearing puller (104) is assembled around the number 4 bearing (95), as shown in FIG. 12A, such that the distal lips (113), as shown in FIG. 12B, of the extended number 4 bearing puller halves (106) engage the fore side of the number 4 bearing (95) and surround the protruding low-pressure turbine shaft (60). The low-pressure turbine shaft engager (110) is placed against the aft end of the low-pressure turbine shaft (60) and the bearing puller engager (114) engages the proximal lips (115) of the extended number 4 bearing puller halves (106). As shown in FIG. 12C, a ring (116) is placed over the extended number 4 bearing puller halves (106) to keep them together. Once the extended number 4 bearing puller (104) is assembled, torque may be applied to the screw mechanism (108) which forces the bearing puller engager (114) away from the low-pressure turbine shaft engager (110). The resulting compressive force on the screw mechanism (108) creates a tension force on the extended number 4 bearing puller halves (106) and pulls the number 4 bearing (95) off of the high-pressure turbine shaft (96).

Once the number 4 bearing (95) is removed, the high-pressure turbine nut (not shown) can be removed. An extended high-pressure turbine shaft stretch fixture (118), shown in FIG. 13, is similar to existing stretch fixtures except that it is adapted to accommodate the presence of the low-pressure turbine shaft (60). The extended high-pressure turbine shaft stretch fixture (118) has a seal plate engaging end (120) and a ram engaging end (122). In use, the seal plate engaging end (120) is placed adjacent the seal plate (94) on the engine (10). An extended high-pressure turbine shaft coupling (124), shown in FIGS. 14A and 14B, has a high-pressure turbine shaft engaging end (126) that is threadingly engagable with the high-pressure turbine shaft (96) when inserted in the extended high-pressure turbine shaft stretch fixture (118). The extended high-pressure turbine shaft coupling (124) has a threaded high-pressure turbine shaft engaging end (126) at its distal end and ram nut threads (128) that can engage a ram nut (130), shown in FIG. 14C, at its proximal end. It should be noted that the extended high-pressure turbine shaft coupling (124) is similar to known high-pressure turbine shaft couplings (124) but it is modified to accommodate the existence of the low-pressure turbine shaft (60).

Figure 15:
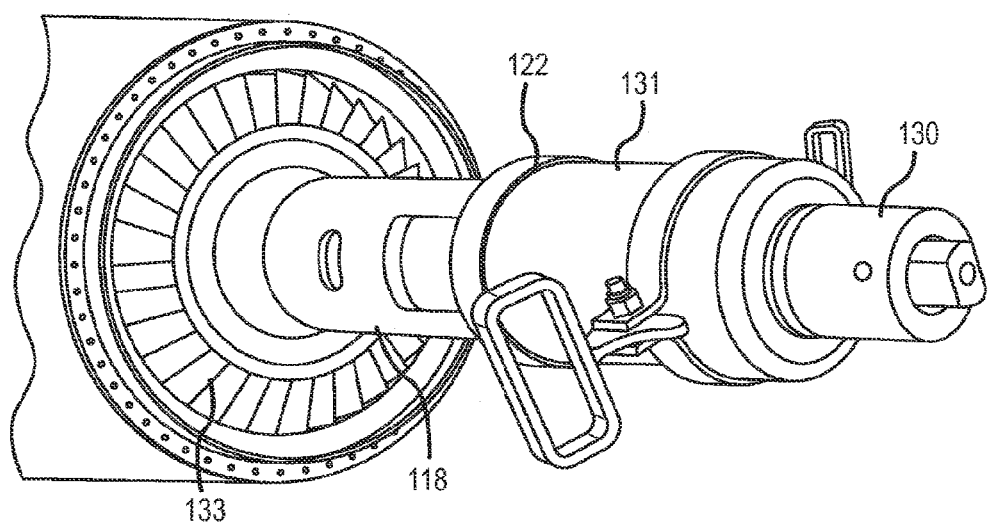
FIG. 15 is a perspective view of one embodiment of an extended high-pressure turbine shaft stretch fixture, ram and extended high-pressure turbine shaft coupling attached to a bypass turbofan engine.

In practice, once the extended high-pressure tool shaft stretch fixture (118) is placed adjacent the seal plate (94) and the extended high-pressure turbine shaft coupling (124) is threadingly engaged with the high-pressure turbine shaft (96), a hydraulic ram (131) is placed adjacent the extended high-pressure turbine shaft stretch fixture ram engaging end (122), as shown in FIG. 15. The extended high-pressure turbine shaft coupling (124) extends through the center of the ram (131) and the ram nut (130) is threadingly engaged with the ram nut threads (128) on the extended high-pressure turbine shaft coupling (124) to secure the ram (131) adjacent the extended high-pressure turbine shaft stretch fixture ram engaging end (122). Once the ram nut (130) is secured adjacent the ram (131), the hydraulic ram (131) can be activated and an axial force is applied to the extended high-pressure tool shaft coupling (124) that is transferred to the high-pressure turbine shaft (96) and the high-pressure turbine shaft (96) is stretched.

Once the high-pressure turbine shaft (96) has been stretched, the high-pressure turbine nut (not shown) can be removed as is conventionally known.

Figure 16:
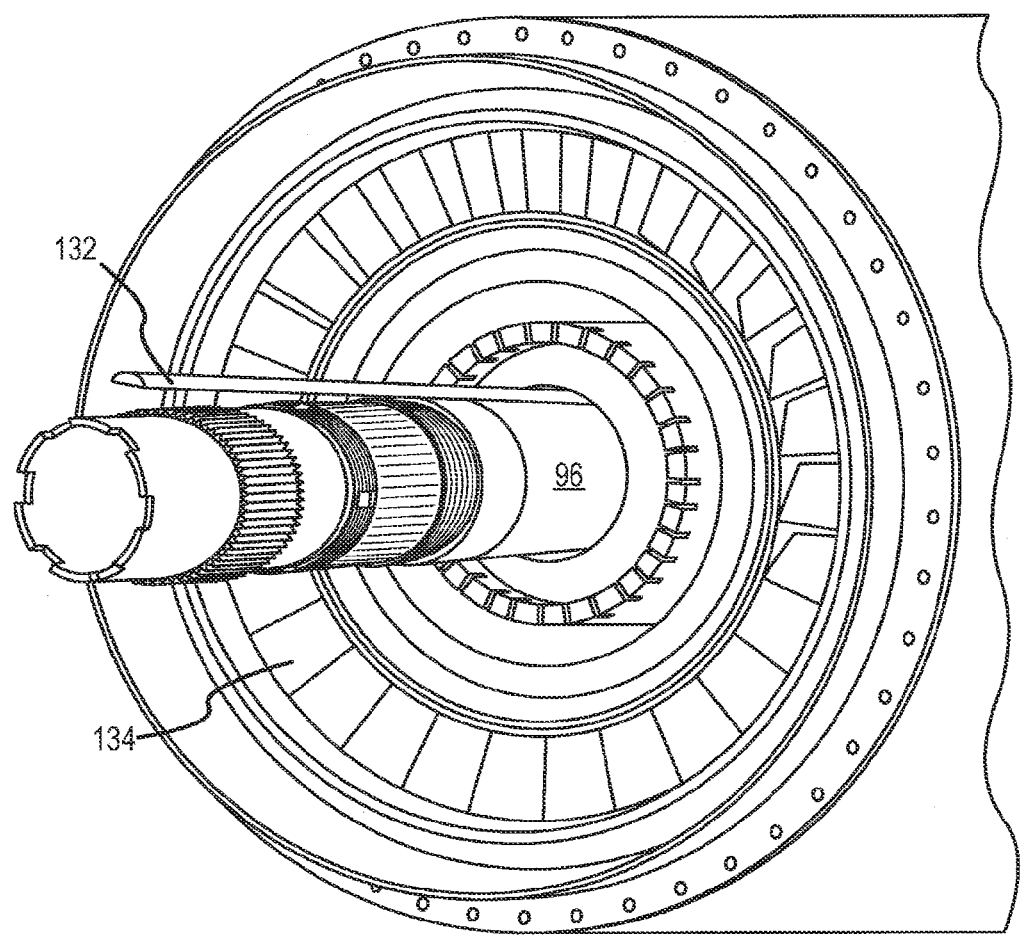
FIG. 16 is a perspective view of one embodiment of a spacer supporting components of a bypass turbofan engine away from the high-pressure turbine shaft.

In one embodiment of the present invention, a spacer (132), as shown in FIG. 16, is slid along the top of the generally horizontally oriented high-pressure turbine shaft (96), once the second stage high-pressure turbine wheel (133) has been removed. The spacer (132) maintains the proper orientation of components within the high-pressure turbine and prevents them from falling against the high-pressure turbine shaft (96) as high-pressure turbine components are removed. The spacer (132) preferably is made of a rigid non-marring material such as wood or Teflon.

Figure 17:
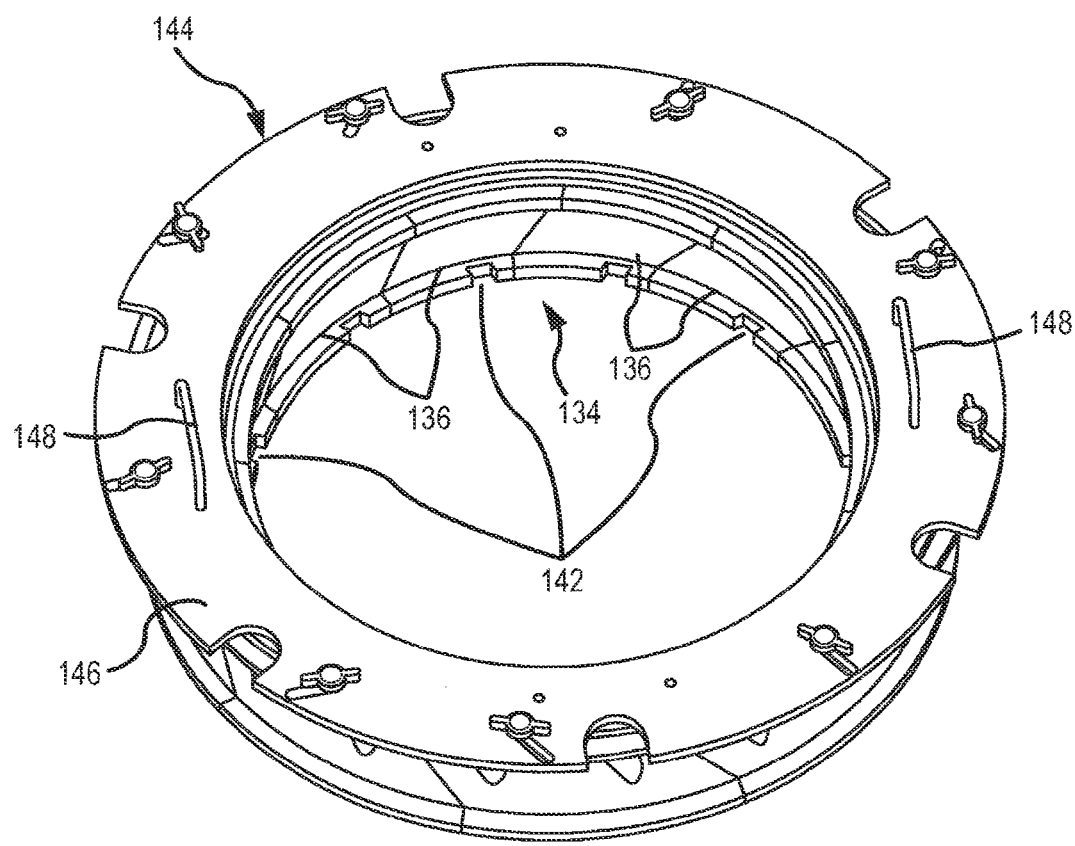
FIG. 17 is a perspective view of one embodiment of a high-pressure turbine nozzle module retaining tool connected to a high-pressure turbine nozzle module.
Figure 18:
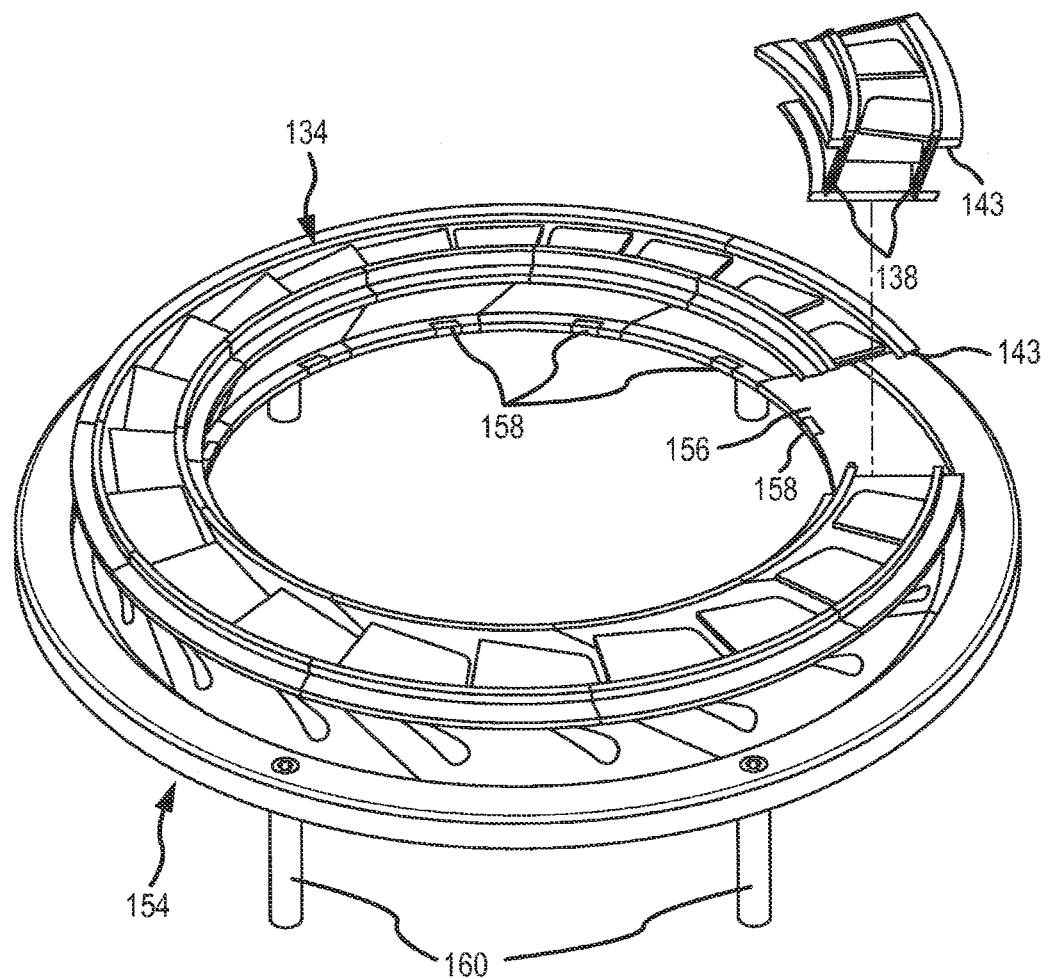
FIG. 18 is a perspective view of a high-pressure turbine nozzle module on a high-pressure turbine nozzle module jig.
Figure 19:
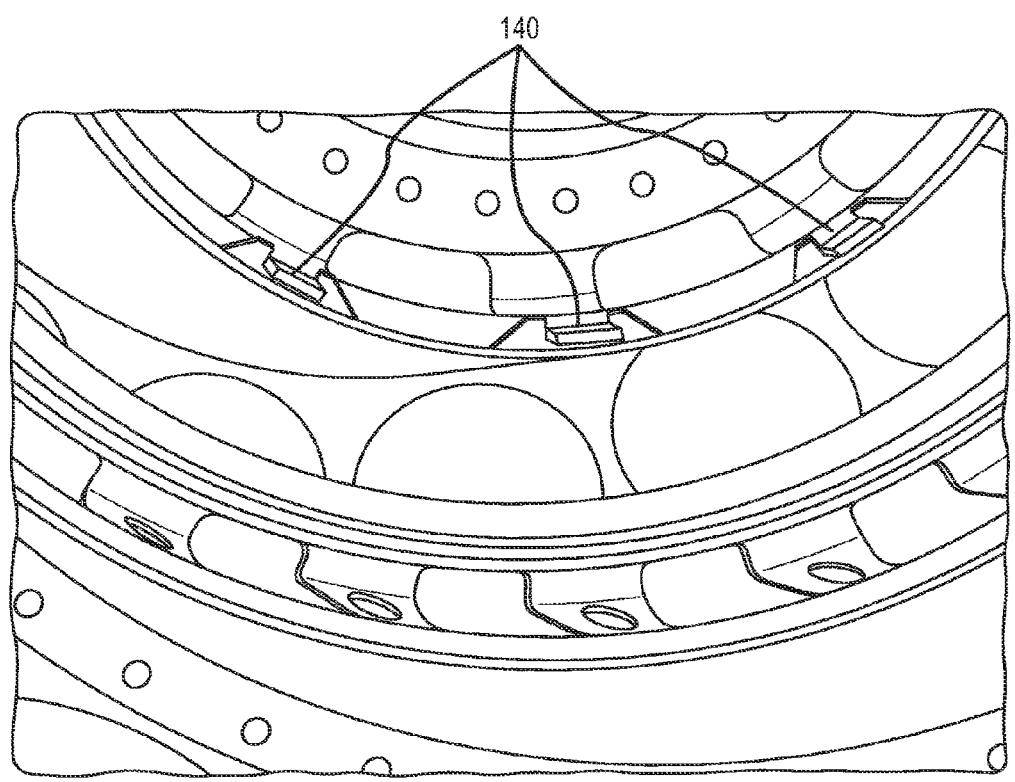
FIG. 19 is a partial perspective view of a combustor can.

Once the second stage high-pressure turbine wheel (133) has been removed, the second stage high-pressure turbine nozzle module (134) may be removed. As shown in FIGS. 17-19, the second stage high-pressure turbine nozzles (136) are connected to one another with feather seals (138) to form the second stage high-pressure turbine nozzle module (134) and are held in place by a plurality of protrusions (140) on the combustor can that engage notches (142) in the individual nozzles (136).

Figure 20:
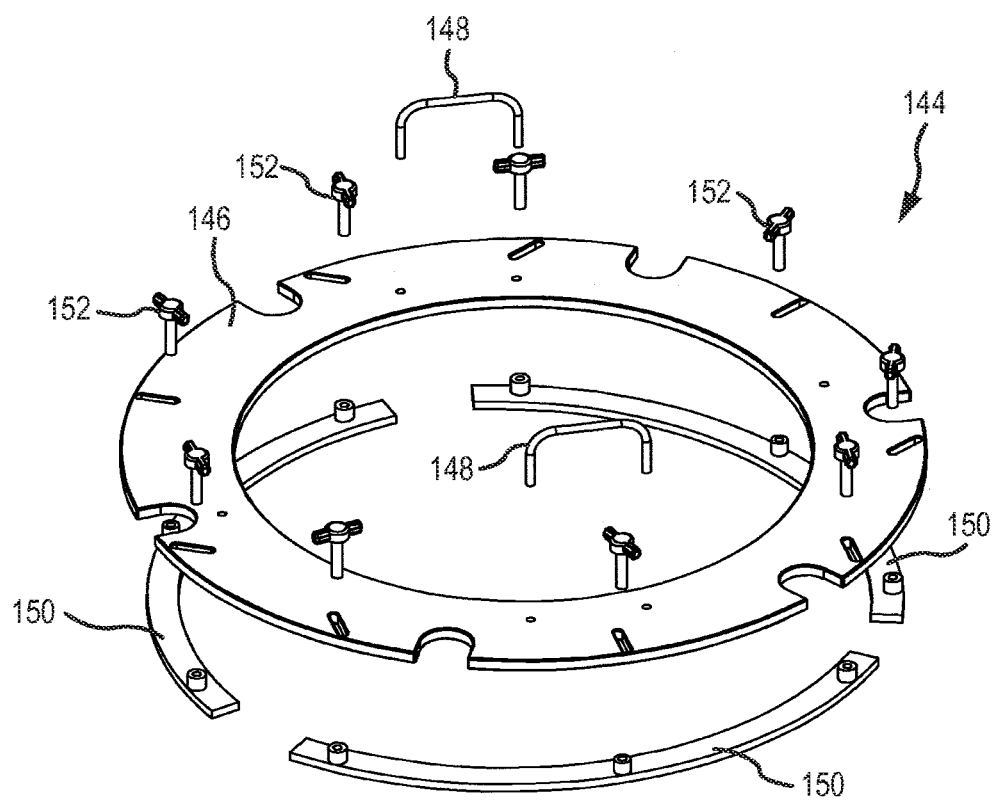
FIG. 20 is an exploded perspective view of a high-pressure turbine nozzle module retaining tool.

The second stage high-pressure turbine nozzles (136) have a lip (143) on their aft periphery when the nozzle is assembled and installed. To remove the second stage high-pressure turbine nozzle module (134), a second stage high-pressure turbine nozzle retaining tool (144) is used. The tool (144) has a plate (146) with handles (148) on its proximal side. As shown in FIG. 20, the second stage high-pressure turbine nozzle retaining tool (144) also has a plurality of arcuate retention members (150) spaced from the distal end of the second stage high-pressure turbine nozzle retaining tool plate's (146) distal side. The retention members (150) may be extended radially outward past the second stage high-pressure turbine nozzle segments aft periphery lips (143) as the second stage high-pressure turbine nozzle retaining tool (134) is positioned adjacent the second stage high-pressure turbine nozzle module (144). Once retention members (150) are past the second stage high-pressure turbine nozzle segments aft periphery lips (143), the retention members (150) may be translated inwardly such that the retention members (150) are on the fore side of the second stage high-pressure turbine nozzle segments aft periphery lips (143) and the plate (146) is on the aft side of the second stage high-pressure turbine nozzle segments aft periphery lips (143). The retention members (150) can be secured to the plate (146) by tightening bolts (152) and the captured nozzles (136) are retained in their proper position and can be removed from the engine (10).

Once removed, the nozzle module (134) may be placed in a second stage high-pressure turbine nozzle alignment fixture (154). The fixture (154) has a planar upper surface (156) from which a plurality of alignment fixture fingers (158) extend. The alignment fixture fingers (158) are positioned to correspond to the protrusions on the combustor can (140) that secure the alignment of the second stage high-pressure turbine nozzles (136). When the second stage high-pressure turbine nozzles (136) are placed on the nozzle alignment fixture (154) with the alignment fixture fingers (158) engaging the notches (142) on the nozzles (136), the second stage high-pressure turbine nozzle module (134) can be assembled and disassembled with relative ease. In one embodiment, the second stage high-pressure turbine nozzle alignment fixture (142) is supported on a plurality of legs (160).

One of ordinary skill in the art will appreciate that the apparatus and methods disclosed are representative and alternatives will be apparent. One of ordinary skill will also recognize that the tools described may be utilized together or alone and that many of the tools may be used in the reassembly of an engine. While the disclosure focuses on an HTF 7000 by-pass turbofan engine, the principals disclosed may have applications to other similar engines.

I claim:

1. A tool system adapted for the assembly or disassembly of a portion of a bypass turbofan engine while a longitudinal axis of said engine is generally horizontal comprising:
    a low pressure turbine module horizontal removal tool adapted to connect to a low pressure turbine module when the longitudinal axis of said bypass turbofan engine is generally horizontal, said low pressure turbine module horizontal removal tool comprising:
        a horizontal member having at least one lift point therein, said at least one lift point adapted for positioning generally above a center of gravity of said low pressure turbine module when the horizontal removal tool is coupled with the low pressure turbine module,
        a vertical member coupled to the horizontal member at a vertical/horizontal member connection located at a different location than the at least one lift point, and
        a hub coupled with the vertical member at a location different than the vertical/horizontal member connection, the hub configured to couple with the low pressure turbine module generally along a longitudinal axis of the low pressure turbine module.

2. The system of claim 1 additionally comprising:
    an extended bearing nut tool disposed radially outward from a low pressure turbine shaft while engaging a bearing nut.

3. The system of claim 2 additionally comprising:
    a stabilization member adapted to connect to a combustion chamber case; and
    said stabilization member adapted to support said extended bearing nut tool such that the longitudinal axis of said extended bearing nut tool is generally horizontal when said extended bearing nut tool engages said bearing nut.

4. The system of claim 2 additionally comprising:
an extended high pressure turbine shaft stretching tool, said extended high pressure turbine shaft stretching tool disposed radially outward from said low pressure turbine shaft.

5. The system of claim 4 additionally comprising:
a stabilization member adapted to connect to a combustion chamber case;
said stabilization member adapted to support said extended bearing nut tool such that the longitudinal axis of said extended bearing nut tool is horizontal when said extended bearing nut tool engages said bearing nut; and
said stabilization member adapted to support said extended high pressure turbine shaft stretching tool such that the longitudinal axis of said extended high pressure turbine shaft stretching tool is generally horizontal when said extended high pressure turbine shaft stretching tool engages a high pressure turbine shaft.

6. The system of claim 5, additionally comprising:
an extended bearing pulling tool, said extended bearing pulling tool adapted to apply a generally horizontal compressive force to said low pressure turbine shaft and a generally horizontal tension force to a bearing.

7. The system of claim 6, additionally comprising:
a high pressure turbine nozzle assembly retaining tool, said nozzle assembly being comprised of a plurality of interlocked nozzle segments and feather seals, said nozzle assembly retaining tool securing said nozzle assembly such that said plurality of nozzle segments and feather seals remain interlocked upon removal; and,
a nozzle assembly jig adapted to properly position said plurality of interlocked nozzle segments and feather seals, said nozzle assembly jig facilitating the interlocked construction of said nozzle assembly from said nozzle segments and feather seals.

8. The system of claim 2 wherein:
said extended bearing nut tool has replaceable teeth.

9. The system of claim 1 additionally comprising:
said low pressure turbine module horizontal removal tool is adapted to permit rotation of said low pressure turbine module about the longitudinal axis of said low pressure turbine module.

10. The system of claim 1, the hub connected to a shaft adapted to rotationally engage a friction reducing insert located between the shaft and an insert housing connected to the vertical member.

11. The system of claim 1 additionally comprising:
said low pressure turbine module horizontal removal tool has a pivot adapted to permit rotation of the longitudinal axis of said low pressure turbine module from generally horizontal to generally vertical.

12. The system of claim 11,
the vertical member including a first vertical member and second vertical member, the hub attached to the second vertical member;
the pivot coupling the first vertical member to the second vertical member; and
a pin adapted to secure the first vertical member in at least two positions relative to the second vertical member.

13. The system of claim 12, a first of the two positions defined when the pin engages aligned apertures within each of the first and second vertical members such that the second vertical member is generally parallel with the first vertical member.

14. The system of claim 13, a second of the two positions configured such that the pin engages a side of the first vertical member such that the second vertical member is generally perpendicular to the first vertical member.

15. The system of claim 1, the low pressure turbine module horizontal removal tool further comprising a detachable attachment member adapted for coupling between the hub and the low pressure turbine module.

16. The system of claim 15, the attachment member including:
an attachment flange adapted for positioning adjacent a first side of a low pressure turbine module lip, and
a securing bracket slot and a securing bracket adapted for insertion therein such that the securing bracket extends radially adjacent a second side of the low pressure turbine module lip, the second side opposite the first side.

17. The system of claim 16, the attachment member including a bracket both adapted to engage the securing bracket via a bracket bolt aperture in the attachment member.

18. The system of claim 15, the attachment member further including a plurality of slots adapted for alignment over pre-existing apertures in the low pressure turbine module, and bolts for threading in the pre-existing apertures.

19. The system of claim 15, the attachment member including a plurality of fingers protruding from a surface of the attachment member opposite the low pressure turbine module surface, the hub including a plurality of protruding receivers respectfully adapted to receive one of the fingers, each of the fingers and receivers including aligned apertures such that a pin is able to engage the aligned apertures to connect the hub to the attachment member.

* * * * *